US00RE47511E

(19) United States
(12) Reissued Patent
Blakeley et al.

(10) Patent Number: US RE47,511 E
(45) Date of Reissued Patent: Jul. 9, 2019

(54) BATTERY-POWERED OCCUPANCY SENSOR

(71) Applicant: Lutron Electronics Co., Inc., Coopersburg, PA (US)

(72) Inventors: Matthew Robert Blakeley, Allentown, PA (US); James P. Steiner, Royersford, PA (US); Adam J. Schrems, Highland Park, IL (US)

(73) Assignee: Lutron Technology Company LLC, Coopersburg, PA (US)

(21) Appl. No.: 14/873,806

(22) Filed: Oct. 19, 2015

Related U.S. Patent Documents

Reissue of:

(64) Patent No.: 8,228,184
Issued: Jul. 24, 2012
Appl. No.: 12/371,183
Filed: Feb. 13, 2009

U.S. Applications:

(63) Continuation-in-part of application No. 12/203,500, filed on Sep. 3, 2008, now Pat. No. 7,940,167.

(51) Int. Cl.

| | |
|---|---|
| ***G08B 29/18*** | (2006.01) |
| ***H05B 37/02*** | (2006.01) |
| ***G08B 13/191*** | (2006.01) |

(52) U.S. Cl.
CPC ..... *H05B 37/0227* (2013.01); *G08B 13/191* (2013.01); *G08B 29/181* (2013.01); *H05B 37/0272* (2013.01); *Y02B 20/44* (2013.01)

(58) Field of Classification Search
CPC ..... G08B 13/191; G08B 29/191; H05B 37/0272; H05B 37/0227; Y02B 20/44
(Continued)

(56) References Cited

U.S. PATENT DOCUMENTS

| | | | |
|---|---|---|---|
| 3,967,258 | A | 6/1976 | Bucy, Jr. |
| 4,367,458 | A | 1/1983 | Hackett |

(Continued)

FOREIGN PATENT DOCUMENTS

| | | |
|---|---|---|
| DE | 3803277 | 8/1989 |
| DE | 29918578 | 12/1999 |
| DE | 10 2004 058051 | 8/2006 |
| GB | 2294569 | 5/1996 |
| WO | WO-99/60803 | 11/1999 |
| WO | WO-99/60804 | 11/1999 |
| WO | WO-2008/030315 | 3/2008 |

OTHER PUBLICATIONS

Skylink Group, "Indoor/Outdoor INSTEON Motion Sensor Model #2420," 2008, 2 pages, http://www.smarthome.com/manuals/2420mqs.pdf.*

(Continued)

*Primary Examiner* — Jalatee Worjloh
(74) *Attorney, Agent, or Firm* — Amy Yanek; Glen Farbanish; Philip Smith

(57) ABSTRACT

A load control system comprises a load control device and a battery-powered occupancy sensor, which transmits a first wireless signal to the load control device in response to detecting the presence of an occupant in a space. The load control system further comprises a visual indicator for providing a visual indication when the magnitude of a battery voltage of a battery of the occupancy sensor has dropped below a predetermined low-battery voltage threshold. The occupancy sensor may comprise the visual indicator, such that the visual indicator is illuminated when the occupancy detects the presence of the occupant in the space and the magnitude of the battery voltage is less than the predetermined threshold. Alternatively, the load control device may comprise the visual indicator, such that the visual indicator is illuminated in response to receiving a second wireless signal, which is transmitting by the occupancy sensor when the magnitude of the battery voltage is less than the predetermined threshold.

20 Claims, 28 Drawing Sheets

(58) Field of Classification Search
USPC ..... 340/539.1, 541, 693.6
See application file for complete search history.

(56) References Cited

U.S. PATENT DOCUMENTS 4,459,582 A 7/1984 Sheahan et al.
4,598,355 A * 7/1986 Shepler ..... G06F 11/00 700/79
5,189,393 A 2/1993 Hu
5,216,333 A 6/1993 Nuckolls
5,248,919 A 9/1993 Hanna et al.
5,293,097 A 3/1994 Elwell
5,386,210 A 1/1995 Lee
5,406,173 A 4/1995 Mix
5,454,077 A 9/1995 Cheron
5,455,487 A 10/1995 Mix
5,489,827 A 2/1996 Xia
5,489,891 A 2/1996 Diong et al.
5,514,946 A * 5/1996 Lin ..... G01R 31/3655 320/150
5,598,042 A 1/1997 Mix
5,623,172 A 4/1997 Zaretsky
5,637,964 A 6/1997 Hakkarainen
5,640,143 A 6/1997 Myron et al.
5,699,243 A 12/1997 Eckel
5,726,900 A 3/1998 Walter
5,736,965 A 4/1998 Mosebrook et al.
5,739,753 A 4/1998 Porter
5,764,146 A 6/1998 Baldwin
5,772,326 A 6/1998 Batko
5,774,322 A 6/1998 Walter
5,786,644 A 7/1998 Zaretsky
5,790,040 A 8/1998 Kreier et al.
5,821,642 A 10/1998 Nishhira
5,838,226 A 11/1998 Houggy
5,848,054 A 12/1998 Mosebrook
5,870,685 A 2/1999 Flynn
5,905,442 A 5/1999 Mosebrook
5,927,844 A 7/1999 Justiniano
5,946,209 A 8/1999 Eckel
5,971,597 A 10/1999 Baldwin
5,973,594 A 10/1999 Baldwin
5,982,103 A 11/1999 Mosebrook et al.
5,984,513 A 11/1999 Baldwin
6,082,894 A 7/2000 Batko
6,114,816 A 9/2000 Nuckolls
6,126,296 A 10/2000 Justiniano
6,138,241 A 10/2000 Eckel
6,151,529 A 11/2000 Batko
6,166,640 A 12/2000 Nishihira
6,225,760 B1 5/2001 Moan
6,275,163 B1 8/2001 Bogorad
6,285,912 B1 9/2001 Ellison
6,289,404 B1 9/2001 Bonasia
6,307,331 B1 10/2001 Bonasia
6,307,354 B1 10/2001 Nishihira
6,324,008 B1 11/2001 Baldwin
6,348,686 B1 2/2002 Howard
6,385,732 B1 5/2002 Eckel
6,388,399 B1 5/2002 Eckel ..... G01K 1/024 315/158
6,390,864 B1 5/2002 Jenkins
6,404,079 B1 6/2002 Hsieh
6,466,826 B1 10/2002 Nishihira
6,472,853 B2 10/2002 Nishihira
6,479,823 B1 11/2002 Strang
6,486,778 B2 11/2002 Mahler et al.
6,583,720 B1 6/2003 Quigley
6,617,560 B2 9/2003 Forke
6,687,487 B1 2/2004 Mosebrook et al.
6,697,757 B2 2/2004 Eckel
6,703,786 B2 3/2004 Tannenbaum
6,710,578 B1 3/2004 Sklovsky
6,729,547 B1 5/2004 Charlier et al.
6,759,954 B1 7/2004 Myron
6,791,458 B2 9/2004 Baldwin
6,798,341 B1 9/2004 Eckel
6,803,728 B2 10/2004 Balasubramaniam
6,807,463 B1 10/2004 Cunningham et al.
6,832,072 B2 12/2004 Buckingham et al.
6,847,302 B2 1/2005 Flanagan et al.
6,856,236 B2 2/2005 Christensen et al.
6,859,644 B2 2/2005 Wang
6,885,300 B1 4/2005 Johnston
6,888,323 B1 5/2005 Null
6,909,668 B2 6/2005 Baldwin
6,912,429 B1 6/2005 Bilger
6,930,260 B2 8/2005 Clegg
6,933,486 B2 8/2005 Pitigoi-Aron
6,940,230 B2 9/2005 Myron
6,952,165 B2 10/2005 Kovach et al.
6,980,080 B2 12/2005 Christensen et al.
7,006,792 B2 2/2006 Wilson
7,027,355 B2 4/2006 Baldwin
7,027,770 B2 4/2006 Judd
7,092,772 B2 8/2006 Murray
7,102,502 B2 9/2006 Autret
7,106,261 B2 9/2006 Nagel
7,116,056 B2 10/2006 Jacoby
7,122,976 B1 10/2006 Null
7,123,139 B2 10/2006 Sweeney
7,126,291 B2 10/2006 Kruse
7,164,110 B2 1/2007 Pitigoi-Aron
7,190,125 B2 3/2007 McDonough et al.
7,190,126 B1 3/2007 Paton
7,208,887 B2 4/2007 Mosebrook
7,211,798 B2 5/2007 Wu
7,219,141 B2 5/2007 Bonasia et al.
7,230,532 B2 6/2007 Albsmeier et al.
7,239,898 B2 7/2007 Lenchik et al.
7,268,682 B2 9/2007 Bialecki, Jr. et al.
7,274,117 B1 9/2007 Viola
7,277,012 B2 10/2007 Johnston
7,295,115 B2 11/2007 Aljadeff et al.
7,307,542 B1 12/2007 Chandler
7,356,429 B2 4/2008 Eskildsen
7,358,927 B2 4/2008 Luebke
7,361,853 B2 4/2008 Clegg
7,362,285 B2 4/2008 Webb
7,369,060 B2 5/2008 Veskovic
7,391,297 B2 6/2008 Cash
7,394,451 B1 7/2008 Patten
7,400,594 B2 7/2008 Pereira et al.
7,400,911 B2 7/2008 Planning et al.
7,405,524 B2 7/2008 Null
7,408,525 B2 8/2008 Webb
7,411,489 B1 8/2008 Elwell et al.
7,414,210 B2 8/2008 Clegg
7,421,247 B2 9/2008 Buckingham et al.
7,432,460 B2 10/2008 Clegg
7,432,463 B2 10/2008 Clegg
7,432,690 B2 10/2008 Williams
7,436,132 B1 10/2008 Null
7,440,246 B2 10/2008 Bonasia
7,480,208 B2 1/2009 Bender
7,480,534 B2 1/2009 Bray
7,486,193 B2 2/2009 Elwell
7,511,613 B2 3/2009 Wang
7,538,285 B2 5/2009 Patel
7,541,924 B2 6/2009 Elwell
7,548,216 B2 6/2009 Webb
7,560,696 B2 7/2009 Wu
7,566,137 B2 7/2009 Veskovic
7,573,208 B2 8/2009 Newman
7,573,436 B2 8/2009 Webb
7,588,067 B2 9/2009 Veskovic
7,592,967 B2 9/2009 Mosebrook
7,623,042 B2 11/2009 Huizenga
7,626,339 B2 12/2009 Paton
7,640,351 B2 12/2009 Reckamp
7,670,039 B2 3/2010 Altonen
7,694,005 B2 4/2010 Reckamp
7,698,448 B2 4/2010 Reckamp
7,723,939 B2 5/2010 Carmen

(56) References Cited

U.S. PATENT DOCUMENTS

| | | | | |
|---|---|---|---|---|
| 7,741,782 | B2 | 6/2010 | Vermeulen | |
| 7,755,505 | B2 | 7/2010 | Johnson | |
| 7,755,506 | B1 | 7/2010 | Clegg | |
| 7,756,556 | B2 | 7/2010 | Patel | |
| 7,768,422 | B2 | 8/2010 | Carmen | |
| 7,768,949 | B2 * | 8/2010 | Perkins et al. | 370/310 |
| 7,778,262 | B2 | 8/2010 | Beagley | |
| 7,787,485 | B2 | 8/2010 | Howe | |
| 7,791,282 | B2 | 9/2010 | Yu | |
| 7,800,049 | B2 | 9/2010 | Bandringa | |
| 7,800,319 | B2 | 9/2010 | Raneri | |
| 7,800,498 | B2 | 9/2010 | Leonard | |
| 7,837,344 | B2 | 11/2010 | Altonen | |
| 7,870,232 | B2 | 1/2011 | Reckamp | |
| 7,872,423 | B2 | 1/2011 | Biery | |
| 7,880,639 | B2 | 2/2011 | Courtney | |
| 7,886,338 | B2 | 2/2011 | Smith | |
| 7,943,876 | B2 | 5/2011 | Kim | |
| 2001/0040805 | A1 | 11/2001 | Lansing | |
| 2002/0011923 | A1 | 1/2002 | Cunningham et al. | |
| 2002/0043938 | A1 | 4/2002 | Lys | |
| 2003/0040813 | A1 | 2/2003 | Gonzales et al. | |
| 2003/0109270 | A1 | 6/2003 | Shorty | |
| 2004/0052076 | A1 | 3/2004 | Mueller et al. | |
| 2004/0129883 | A1 | 7/2004 | Dougherty | |
| 2005/0086366 | A1 | 4/2005 | Luebke et al. | |
| 2005/0101287 | A1 | 5/2005 | Jin et al. | |
| 2005/0280598 | A1 | 12/2005 | Webb et al. | |
| 2006/0028997 | A1 | 2/2006 | McFarland | |
| 2006/0037380 | A1 | 2/2006 | Bulst et al. | |
| 2006/0044152 | A1 | 3/2006 | Wang | |
| 2006/0174102 | A1 | 8/2006 | Smith et al. | |
| 2006/0185799 | A1 | 8/2006 | Kates | |
| 2006/0215588 | A1 | 9/2006 | Yoon | |
| 2007/0013531 | A1 | 1/2007 | Hules et al. | |
| 2007/0030148 | A1 | 2/2007 | Gabriel | |
| 2007/0182580 | A1 | 8/2007 | Elwell | |
| 2007/0183329 | A1 | 8/2007 | Elwell | |
| 2007/0222584 | A1 | 9/2007 | Albsmeier et al. | |
| 2007/0272293 | A1 | 11/2007 | Schmidt | |
| 2008/0027586 | A1 * | 1/2008 | Hern | A01G 25/167 700/284 |
| 2008/0055073 | A1 | 3/2008 | Raneri et al. | |
| 2008/0058883 | A1 | 3/2008 | Gautier et al. | |
| 2008/0068126 | A1 | 3/2008 | Johnson et al. | |
| 2008/0068204 | A1 | 3/2008 | Carmen et al. | |
| 2008/0074059 | A1 | 3/2008 | Ahmed | |
| 2008/0088181 | A1 | 4/2008 | Cash | |
| 2008/0088435 | A1 | 4/2008 | Cash | |
| 2008/0111491 | A1 | 5/2008 | Spira | |
| 2008/0136663 | A1 | 6/2008 | Courtney et al. | |
| 2008/0218099 | A1 | 9/2008 | Newman | |
| 2008/0224835 | A1 | 9/2008 | Noest | |
| 2008/0273754 | A1 | 11/2008 | Hick | |
| 2008/0303661 | A1 | 12/2008 | Chick | |
| 2009/0174552 | A1 | 7/2009 | Soccoli | G01J 1/02 340/541 |
| 2009/0206983 | A1 | 8/2009 | Knode et al. | |
| 2010/0052576 | A1 | 3/2010 | Steiner et al. | |

OTHER PUBLICATIONS

Pericom Technology Inc., Data Sheet: PT8A263 PIR Alarm COntroller, Ver. 4, Mar. 2003, 11 pages, http://www.pericom.com/assets/DataSheets/PT8A6.pdf.*

Smarthome, "INSTEON Wireless Motion Sensor—2420M," archived by the Internet Archive Wayback Machine on Aug. 5, 2008, 3 pages (hereinafter "Archive").*

Card Access, Inc., In Home Wireless Motion Sensor Installation Guide, installation guide, 2007.

Search Report issued by PCT dated Jan. 10, 2009 in connection with related PCT application No. PCT/US2009/004666.

Clipsal Australia Pty Ltd., 90 degree PIR Wireless Security Sensor 5240/90F Installation Instructions, Feb. 2007, 16 pages, http://www2.clipsal.com/cis/_data/page/2034/5420-90_90DegreePIR_WirelessSecuritySensor-Installation.pdf.

Clipsal Australia Pty Ltd., HomeSafe Security Panel 5400 & 5400/16CB Installation and Programming Manual, Sep. 2005, 76 pages, http://www2.clipsal.com/cis/_data/page/428/5400%20&%20540016CB%20Install%20Instructions2.pdf.

Elmes Electronic, Wireless Passive Infrared (PIR) Motion Detector PTX50, 2004, 1 page, http://leiras.lantech.hu/leirasok/elmes/angol/PTX50_eng.pdf.

Linear Corporation, DXT-54 Wireless Motion Detector Installation Instructions, 1995, 1 page, http://www.linearcorp.com/pdf/manuals/DXT-54.pdf.

Control Products, Inc. MiniAlarm Plus Model MA-5000, 2005, 16 pages, http://www.specialtyalarms.com/site/1313932/uploaded/MA-5000.pdf.

Ericsson Inc., LBI-38732E Operator's Manual: EDACS® M-RK II Portable Radio, Oct. 1992, 112 pages, http://www.repeater-builder.com/ge/lbi-library/lbi-38732e.pdf.

Heathco LLC, Solar Powered Motion Sensor Light Model 7001, Mar. 7, 2008, 12 pages, http://heath-zenith.hcents.com/data/manuals/598-1305-02.pdf.

Shenzhen Patrol Hawk Technology Co., Ltd., Wireless Door/Window Magnetic Contact, Sep. 14, 2007, 4 pages, http://gsmalarmsystems.com/ArticleShow2.asp?ArticleID=44.

Skylink Technologies Inc., Total Protection Alarm System Model SC-100 User's Instructions, Oct. 2004, 29 pages, http://www.smarthomeusa.com/products/SC-1000/manuals/SC100-manual.pdf.

Smarthome, INSTEON Wireless Motion Sensor—2420M, 3 pages, originally available at http://www.smarthome.com/2420m.html, archived by the Internet Archive Wayback Machine on Aug. 5, 2008 at http://web.archive.org/web/20080805072013/http://www.smarthome.com/2420m.html.

Smarthome, Low battery sensing on new INSTEON motion Sensor, Forum Topic #3721, Aug. 4-5, 2008, 6 pages, http://www.smarthome.com/forum/pop_printer_friendly.asp?TOPIC_ID=3721.

X10 Wireless Technology Inc., Motion Detector Model MS18A, Jan. 2005, 2 pages, http://ftp.x10.com/pub/manuals/MS18A-OM.PDF.

U.S. Appl. No. 10/873,033, filed Jun. 2004, Webb (Same as US-2005/02805698).

U.S. Appl. No. 11/559,166, filed Nov. 2006, Spira et al. (Same as US-2008/0111491).

U.S. Appl. No. 12/033,223, filed Feb. 2008, Knode et al. (Same as US-2009/0206983).

U.S. Appl. No. 10/873,033, filed Jun. 21, 2006.

U.S. Appl. No. 11/559,166, filed Nov. 13, 2006.

U.S. Appl. No. 12/033,223, filed Feb. 19, 2008.

International Preliminary Report on Patentability dated Mar. 17, 2011 issued in corresponding PCT International Application No. PCT/US2009/004756.

InHome Wireless Motion Sensor Installation Guide, installation guide, 2007, Card Access, Inc.

"Appendix of Evidences" from Reexam 8,009.042.

* cited by examiner

BATTERY-POWERED OCCUPANCY SENSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a continuation-in-part of commonly-assigned, co-pending U.S. patent application Ser. No. 12/203,500, filed Sep. 3, 2008, entitled BATTERY-POWERED OCCUPANCY SENSOR, the entire disclosure of which is hereby incorporated by reference.

BACKGROUND OF THE INVENTION

1. Field of the Invention

The present invention relates to occupancy and vacancy sensors for detecting an occupancy or a vacancy in a space, and more particularly, to a wireless load control system including a plurality of battery-powered occupancy or vacancy sensors for detecting an occupancy or a vacancy in a space, and a load control device for controlling the amount of power delivered to an electrical load in response to the occupancy or vacancy sensors.

2. Description of the Related Art

Occupancy and vacancy sensors are often used to detect occupancy and/or vacancy conditions in a space in order to control an electrical load, such as, for example, a lighting load. An occupancy sensor typically operates to turn on the lighting load when the occupancy sensor detects the presence of a user in the space (i.e., an occupancy event) and then to turn off the lighting load when the occupancy sensor detects that the user has left the space (i.e., a vacancy event). A vacancy sensor only operates to turn off the lighting load when the vacancy sensor detects a vacancy in the space. Therefore, when using a vacancy sensor, the lighting load must be turned on manually (e.g., in response to a manual actuation of a control actuator).

Occupancy and vacancy sensors have often been provided in wall-mounted load control devices that are coupled between an alternating-current (AC) power source and an electrical load for control of the amount of power delivered to the electrical load. Such wall-mounted load control devices typically comprise internal detectors, such as, for example, a pyroelectric infrared (PIR) detector, and a lens for directing energy to the PIR detector for detecting the presence of the user in the space. However, since the wall-mounted load control devices are mounted to a wall in a standard electrical wallbox (i.e., replacing a standard light switch), the detection of energy by the PIR detector may be hindered due to the direction that the load control device is facing and by obstacles in the space, thus increasing the likelihood that the load control device may not detect the presence of a user.

Some prior art occupancy and vacancy sensors have been provided as part of lighting control systems. These sensors are typically coupled via a wired control link to a lighting controller (e.g., a central processor), which then controls the lighting loads accordingly. Since the control link is typically a low-voltage control link, these occupancy and vacancy sensors are not required to be mounted in electrical wallboxes, but may be mounted to the ceiling or high on a wall.

Therefore, the occupancy and vacancy sensors may be positioned optimally to detect the presence of the user in all areas of the space. However, these prior art lighting control systems require advanced system components and configuration procedures in order to operate properly.

Thus, there is a need for a simple lighting control system that has occupancy or vacancy sensors which may be easily and optimally installed into a space.

SUMMARY OF THE INVENTION

According to a first embodiment of the present invention, a load control system for controlling the amount of power delivered from an AC power source to an electrical load in a space in response to detecting the presence or absence of an occupant in the space comprises a load control device, an occupancy sensor, and a visual indicator for providing a visual indication when the magnitude of a battery voltage of a battery of the occupancy sensor has dropped below a predetermined low-battery voltage threshold. The load control device is adapted to be coupled in series electrical connection between the AC power source and the electrical load for control of the amount of power delivered to the electrical load. The load control device receives wireless control signals and controls the amount of power delivered to the electrical load in response to the wireless control signals. The occupancy sensor comprises a controller, an occupancy detector circuit for detecting the presence or absence of the occupant in the space, and a wireless transmitter for transmitting a first wireless control signal to the load control device in response to the occupancy detector circuit detecting the presence of the occupant in the space. The load control device enables the delivery of power to the electrical load in response to the first wireless control signal. The controller monitors the magnitude of the battery voltage of the battery, which powers the controller and the wireless transmitter, and causes the visual indicator to provide the visual indication when the magnitude of the battery voltage has dropped below the predetermined low-battery voltage threshold.

According to another embodiment of the present invention, a wireless occupancy sensor for detecting the presence or absence of an occupant in a space, the sensor comprises: (1) a detector circuit for detecting the presence or absence of the occupant in the space; (2) a controller coupled to the detector circuit, such that the controller is responsive to the detector circuit; (3) a wireless transmitter coupled to the controller for transmitting wireless signals; (4) a visual indicator coupled to the controller, such that the controller is operable to controllably illuminate the visual indicator; and (5) a battery for producing a battery voltage for powering the detector circuit, the controller, the wireless transmitter, and the visual indicator. The controller monitors the magnitude of the battery voltage of the battery, transmits wireless signals in response to the detector circuit detecting the presence of the occupant in the space if the magnitude of the battery voltage is greater than or equal to a predetermined low-battery voltage threshold, and illuminates the visual indicator in response to the detector circuit detecting the presence of the occupant in the space if the magnitude of the battery voltage is less than the predetermined low-battery voltage threshold.

In addition, a method of controlling the amount of power delivered from an AC power source to an electrical load located in a space is described herein. The method comprises the steps of: (1) providing an occupancy sensor having a first battery, a controller, an occupancy detector circuit, and a wireless transmitter; (2) powering the controller and the wireless transmitter with the first battery; (3) detecting the presence of an occupant in the space; (4) transmitting a first wireless signal in response to the step of detecting the presence of an occupant in the space in the space; (5) monitoring the magnitude of a first battery voltage of the first battery; (6) determining that the magnitude of the first battery voltage has dropped below a predetermined low-battery voltage threshold; and (7) providing a visual indication in response to determining that the magnitude of the battery voltage has dropped below the predetermined low-battery voltage threshold.

Other features and advantages of the present invention will become apparent from the following description of the invention that refers to the accompanying drawings.

DETAILED DESCRIPTION OF THE INVENTION

Figure 1A:
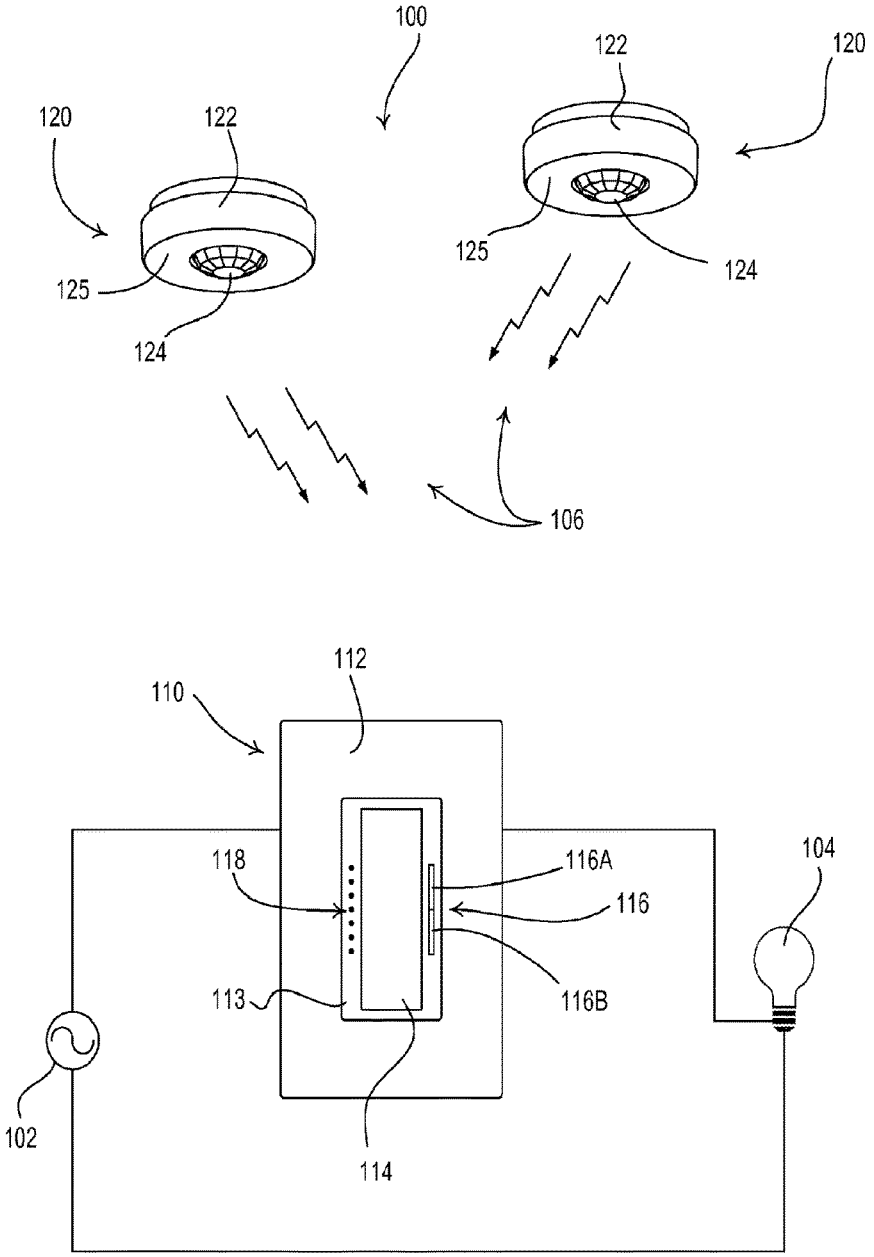
FIG. 1A is a simple diagram of a radio-frequency (RF) lighting control system having a dimmer switch and remote occupancy sensors for control of the amount of power delivered to a lighting load according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1A is a simple diagram of a radio-frequency (RF) lighting control system 100 comprising a dimmer switch 110 and two remote occupancy sensors 120 (e.g., passive infrared sensors). The dimmer switch 110 is adapted to be coupled in series electrical connection between an AC power source 102 and a lighting load 104 for controlling the amount of power delivered to the lighting load. The dimmer switch 110 may be adapted to be wall-mounted in a standard electrical wallbox. Alternatively, the dimmer switch 110 could be implemented as a table-top load control device. The dimmer switch 110 comprises a faceplate 112 and a bezel 113 received in an opening of the faceplate. The dimmer switch 110 further comprises a toggle actuator 114, i.e., a button, and an intensity adjustment actuator 116. Actuations of the toggle actuator 114 toggle, i.e., turn off and on, the lighting load 104. Actuations of an upper portion 116A or a lower portion 116B of the intensity adjustment actuator 116 respectively increase or decrease the amount of power delivered to the lighting load 104 and thus increase or decrease the intensity of the lighting load 104 from a minimum intensity (e.g., 1%) to a maximum intensity (e.g., 100%). A plurality of visual indicators 118, e.g., light-emitting diodes (LEDs), are arranged in a linear array on the left side of the bezel 113. The visual indicators 118 are illuminated to provide feedback of the intensity of the lighting load 104. An example of a dimmer switch having a toggle actuator 114 and an intensity adjustment actuator 116 is described in greater detail in U.S. Pat. No. 5,248,919, issued Sep. 29, 1993, entitled LIGHTING CONTROL DEVICE, the entire disclosure of which is hereby incorporated by reference.

The remote occupancy sensors 120 are removably mountable to a ceiling or a wall, for example, in the vicinity of (i.e., a space around) the lighting load 104 controlled by the dimmer switch 110, and are operable to detect an occupancy condition (i.e., the presence of an occupant) or a vacancy condition (i.e., the absence of an occupant) in the vicinity of the lighting load. The occupancy sensors 120 may be spaced apart to detect occupancy conditions in different areas of the vicinity of the lighting load 104. The remote occupancy sensors 120 each include an internal detector, e.g., a pyroelectric infrared (PIR) detector 310 (FIG. 3), which is housed in an enclosure 122 and will be described in greater detail below. The enclosure 122 comprises a lens 124 (e.g., an outwardly domed lens) provided in a front surface 125 of the enclosure 122. The internal detector is operable to receive infrared energy from an occupant in the space via the lens 124 to thus sense the occupancy condition in the space. The occupancy sensors 120 are operable to process the output of the PIR detector 310 to determine whether an occupancy condition or a vacancy condition is presently occurring in the space, for example, by comparing the output of the PIR detector 310 to a predetermined occupancy voltage threshold. Alternatively, the internal detector could comprise an ultrasonic detector, a microwave detector, or any combination of PIR detectors, ultrasonic detectors, and microwave detectors.

Figure 1B:
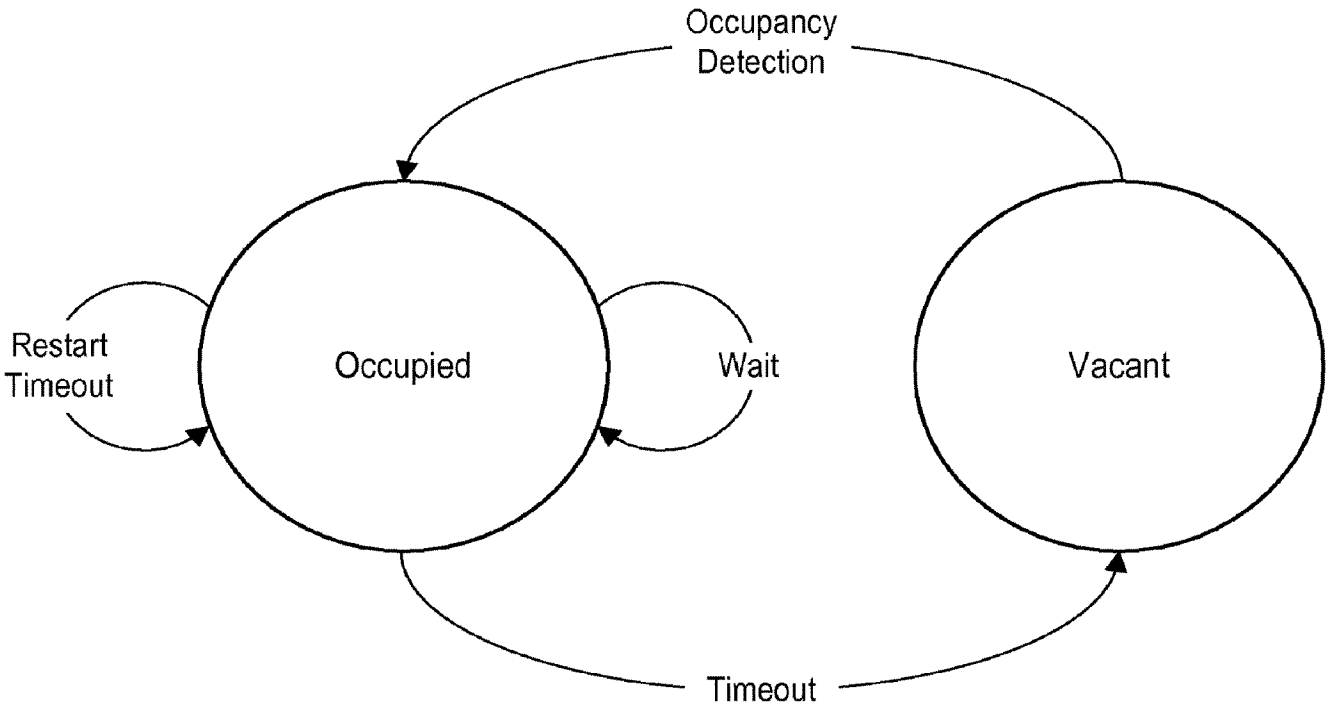
FIG. 1B is a simplified state diagram illustrating the operation of one of the occupancy sensors of the RF lighting control system of FIG. 1A.

FIG. 1B is a simplified state diagram illustrating the operation of the occupancy sensors 120 of the RF lighting control system 100. The occupancy sensors 120 each operate in an "occupied" state or a "vacant" state in response to the detections of occupancy or vacancy conditions, respectively, in the space. If one of the occupancy sensors 120 is in the vacant state and the occupancy sensor determines that the space is occupied in response to the PIR detector 310, the occupancy sensor changes to the occupied state.

During a setup procedure of the RF lighting control system 100, the dimmer switch 110 may be assigned to (i.e., associated with) one or more remote occupancy sensors 120. The remote occupancy sensors 120 transmit digital messages wirelessly via RF signals 106 to the dimmer switch 110 in response to the present state of the occupancy sensors. A message transmitted by the remote occupancy sensors 120 may include a command and indentifying information, for example, a 52-bit serial number (i.e., a unique identifier) associated with the transmitting occupancy sensor. The dimmer switch 110 is responsive to messages containing the serial numbers of the remote occupancy sensors 120 to which the dimmer switch is assigned.

The commands included in the digital messages transmitted by the occupancy sensors 120 may comprise an occupied command (e.g., an occupied-take-action command or an occupied-no-action command) or a vacant command. When the lighting load 104 is off, the dimmer switch 110 is operable to turn on the lighting load in response to receiving a first occupied-take-action command from any one of the occupancy sensors 120. The dimmer switch 110 is operable to turn off the lighting load 104 in response to the last vacant command received from those occupancy sensors 120 from which the occupancy sensor received either occupied-take-action or occupied-no-action commands. For example, if the occupancy sensors 120 both transmit occupied-take-action commands to the dimmer switch 110, the dimmer switch will not turn off the lighting load 104 until subsequent vacant commands are received from both of the occupancy sensors.

Each occupancy sensor 120 also comprises an ambient light detector 234 (FIG. 2B), e.g., a photocell, for detecting the level of ambient light around the occupancy sensor. The occupancy sensor 120 only measures the ambient light level when an occupancy condition is first detected. The ambient light level is compared to a predetermined ambient light level threshold. If the measured ambient light level is less than the predetermined level when an occupancy condition is first detected by one of the occupancy sensors 120, the occupancy sensor transmits the occupied-take-action command to the dimmer switch 110. On the other hand, if the measured ambient light level is greater than the predetermined level when an occupancy condition is first detected, the occupancy sensor 120 transmits the occupied-no-action command to the dimmer switch 110. Accordingly, the dimmer switch 110 does not turn on the lighting load 104 if the ambient light level in the space is sufficiently high.

While one of the occupancy sensors 120 continues to detect the occupancy condition in the space (i.e., a continued occupancy condition), the occupancy sensor regularly transmits the occupied-no-action command to the dimmer switch 110, such that the dimmer switch knows that the occupancy sensor 120 is still in the occupied state. In response to receiving the occupied-no-action command, the dimmer switch 110 either maintains the lighting load 104 on (e.g., if an occupied-take-action command was previously received) or maintains the lighting load off.

The occupancy sensors 120 are each characterized by a predetermined occupancy sensor timeout period $T_{TIMEOUT}$, which provides some delay in the adjustment of the state of the occupancy sensor, specifically, in the transition from the occupied state to the vacant state. The predetermined occupancy sensor timeout period $T_{TIMEOUT}$ may be user-selectable ranging, for example, from five to thirty minutes. Each occupancy sensor 120 will not transmit a vacant command until the occupancy sensor timeout period $T_{TIMEOUT}$ has expired. Each occupancy sensor 120 maintain an occupancy timer to keep track of the time that has expired since the last detected occupancy condition. The occupancy sensors 120 periodically restart the occupancy timers in response to determining an occupancy condition (as shown by "Restart Timer" in the state diagram of FIG. 1B). Accordingly, the occupancy sensors 120 do not change to the vacant state, and the lighting load 104 is not turned off, in response to brief periods of a lack of movement of the occupant in the space. If the occupancy sensor 120 fails to continue detecting the occupancy conditions, the occupancy sensor 120 waits for the length of the occupancy sensor timeout period $T_{TIMEOUT}$ (as shown by "Wait" in the state diagram of FIG. 1B). After the occupancy timer expires, the occupancy sensor 120 changes to the vacant state and transmits a vacant command to the dimmer switch 110 (as shown by "Timeout" in the state diagram of FIG. 1B).

Figure 1C:
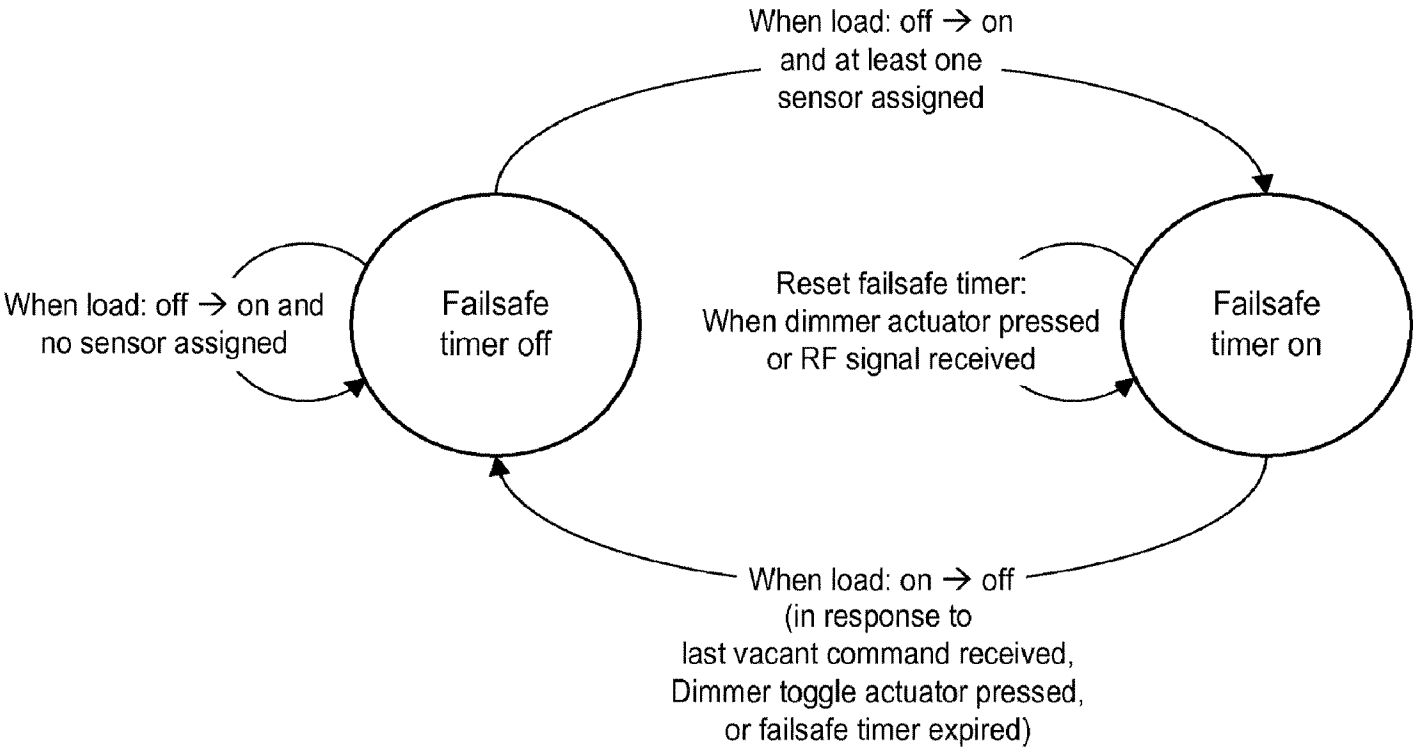
FIG. 1C is a simplified state diagram illustrating the state of a failsafe timer of the dimmer switch of the RF lighting control system of FIG. 1A.

If the dimmer switch 110 does not receive a digital message from any of the occupancy sensors 120 for a failsafe timeout period $T_{FAILSAFE}$, the dimmer switch 110 assumes that all of the occupancy sensors are in the vacant state and turns off the lighting load 104. To accomplish this control, the dimmer switch 110 maintains a failsafe timer. FIG. 1C is a simplified state diagram illustrating the state of the failsafe timer of the dimmer switch 110. The failsafe timer is started when the lighting load 104 is controlled from off to one and at least one occupancy sensor 120 is assigned to the dimmer switch 110. If there are not any occupancy sensors 120 assigned to the dimmer switch 110 when the lighting load 104 is turned on, the failsafe timer is not started. The failsafe timer is reset to the value of the failsafe timeout period $T_{FAILSAFE}$ in response to receiving a digital message from any of the occupancy sensors 120 assigned to the dimmer switch 110 or in response to actuations of any the dimmer actuators (which do not cause the lighting load 104 to be turned off). When the failsafe timer expires, the dimmer switch 110 assumes that all of the occupancy sensors are in the vacant state and turns off the lighting load 104. The failsafe timer is stopped whenever the lighting load 104 is turned off (i.e., when vacant commands are received from all occupancy sensors 120, when one of the dimmer actuators is actuated to turn off the lighting load, or when the failsafe timer expires).

Figure 1D:
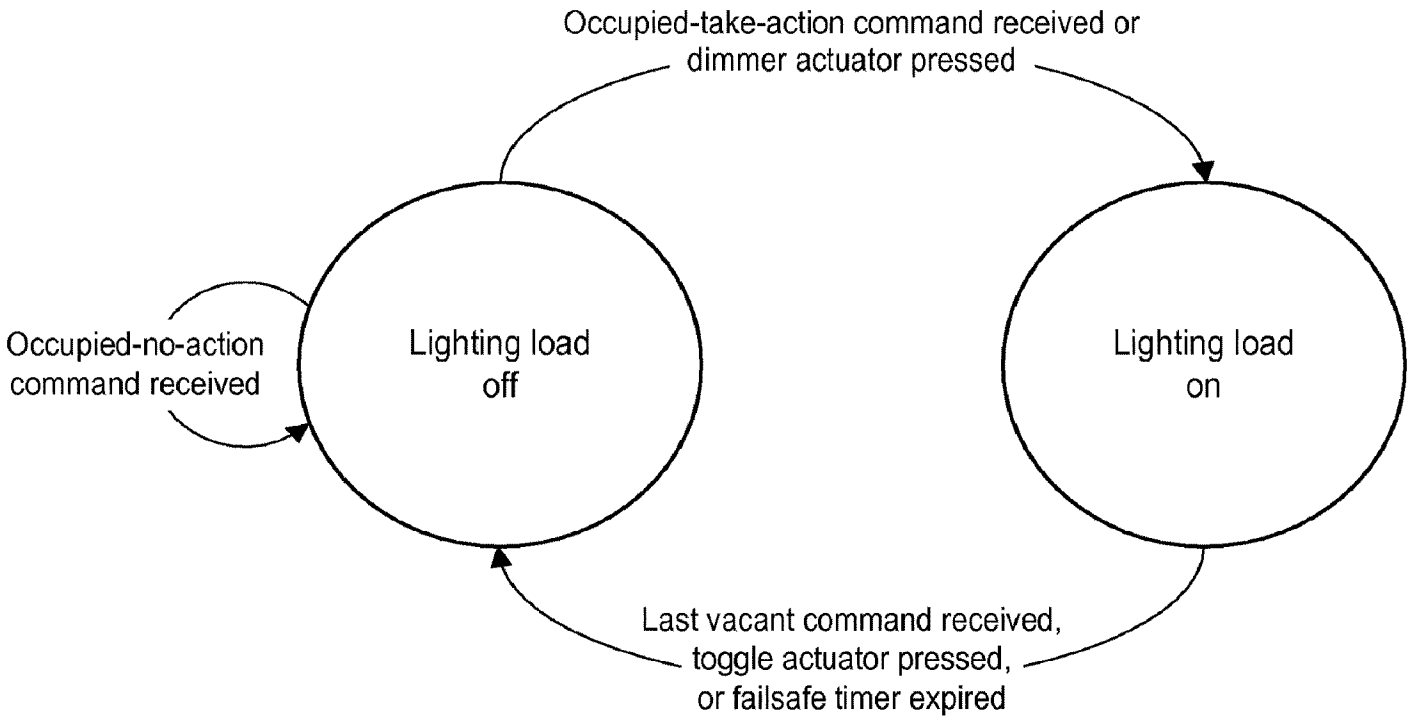
FIG. 1D is a simplified state diagram illustrating how the dimmer switch of the RF lighting control system of FIG. 1A controls the lighting load.

The dimmer switch 110 controls the lighting load 104 in response to the received digital messages as well as actuations of the dimmer actuators (i.e., toggle actuator 114 and the intensity adjustment actuator 116) and the failsafe timer. FIG. 1D is a simplified state diagram illustrating how the dimmer switch 110 controls the state of the lighting load 104 (i.e., between on and off). The dimmer switch 110 does not control the intensity of the lighting load 104 in response to the occupied-no-action commands. The dimmer switch 110 turns on the lighting load 104 when the first occupied-take-action command is received or when one of the dimmer actuators is actuated to turn on the lighting load. Further, the dimmer switch 110 turns off the lighting load 104 when the last vacant command is received from the occupancy sensors 120, when one of the dimmer actuators is actuated to turn off the lighting load, or when the failsafe timer expires.

Figure 2A:
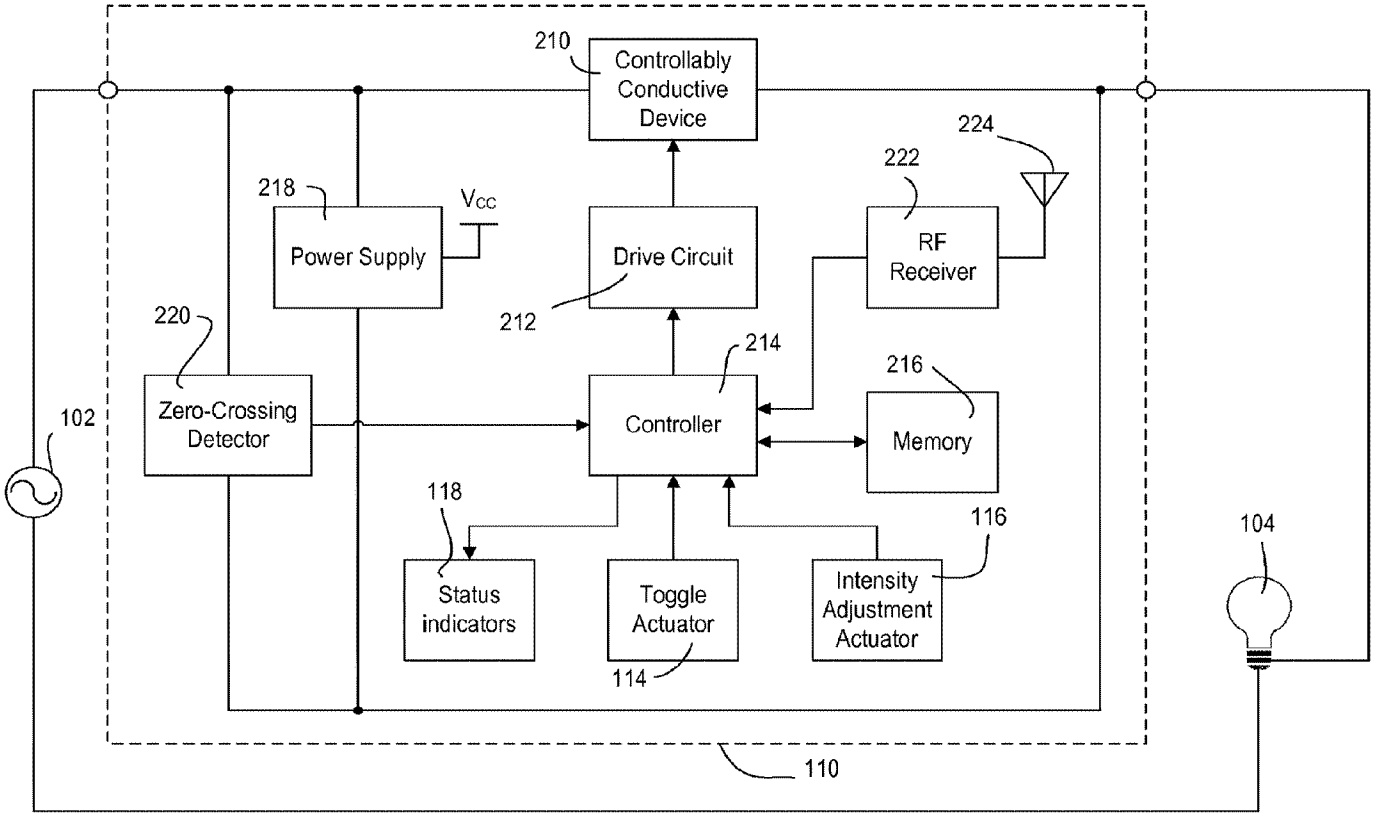
FIG. 2A is a simplified block diagram of the dimmer switch of the RF lighting control system of FIG. 1A.

FIG. 2A is a simplified block diagram of the dimmer switch 110. The dimmer switch 110 comprises a controllably conductive device 210 coupled in series electrical connection between the AC power source 102 and the lighting load 104 for control of the power delivered to the lighting load. The controllably conductive device 210 may comprise any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The input to the control input will render the controllably conductive device 210 conductive or non-conductive, which in turn controls the power supplied to the lighting load 104.

The drive circuit 212 provides control inputs to the controllably conductive device 210 in response to command signals from a controller 214. The controller 214 is preferably implemented as a microcontroller, but may be any suitable processing device, such as a programmable logic device (PLD), a microprocessor, or an application specific integrated circuit (ASIC). The controller 214 receives inputs from the toggle actuator 114 and the intensity adjustment actuator 116 and controls the status indicators 118. The controller 214 is also coupled to a memory 216 for storage of the preset intensity of lighting load 104 and the serial number of the occupancy sensor 120 to which the dimmer switch 110 is assigned. The memory 216 may be implemented as an external integrated circuit (IC) or as an internal circuit of the controller 214. A power supply 218 generates a direct-current (DC) voltage $V_{CC}$ for powering the controller 214, the memory 216, and other low-voltage circuitry of the dimmer switch 110.

A zero-crossing detector 220 determines the zero-crossings of the input AC waveform from the AC power supply 102. A zero-crossing is defined as the time at which the AC supply voltage transitions from positive to negative polarity, or from negative to positive polarity, at the beginning of each half-cycle. The zero-crossing information is provided as an input to controller 214. The controller 214 provides the control inputs to the drive circuit 212 to operate the controllably conductive device 210 (i.e., to provide voltage from the AC power supply 102 to the lighting load 104) at predetermined times relative to the zero-crossing points of the AC waveform.

The dimmer switch 110 further comprises an RF receiver 222 and an antenna 224 for receiving the RF signals 106 from the occupancy sensor 120. The controller 214 is operable to control the controllably conductive device 210 in response to the messages received via the RF signals 106. Examples of the antenna 224 for wall-mounted dimmer switches, such as the dimmer switch 110, are described in greater detail in U.S. Pat. No. 5,982,103. issued Nov. 9, 1999, and U.S. patent application Ser. No. 10/873,033, filed Jun. 21, 2006, both entitled COMPACT RADIO FREQUENCY TRANSMITTING AND RECEIVING ANTENNA AND CONTROL DEVICE EMPLOYING SAME. The entire disclosures of both are hereby incorporated by reference.

Figure 2B:
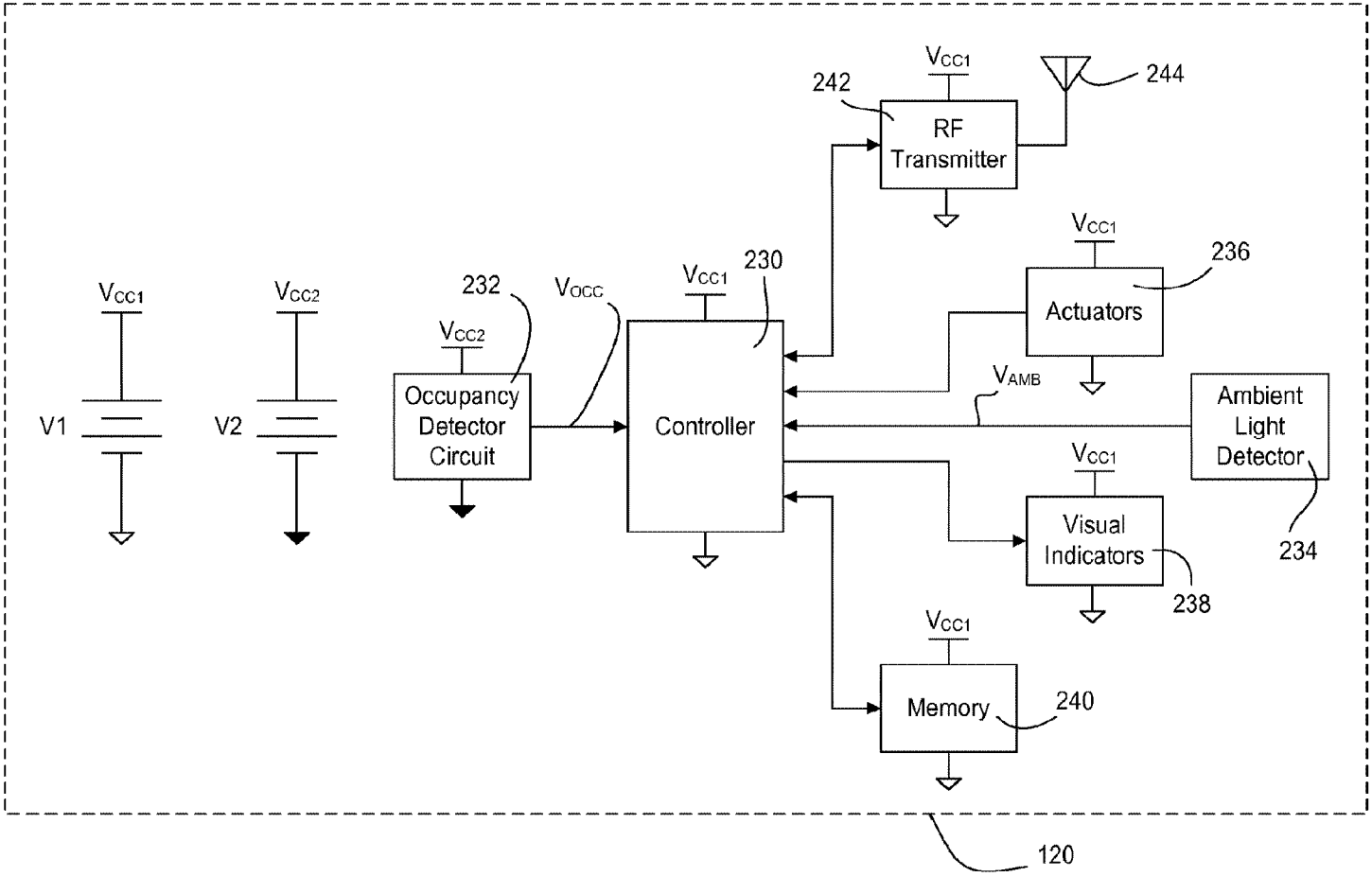
FIG. 2B is a simplified block diagram of one of the remote occupancy sensors of the RF lighting control system of FIG. 1A.

FIG. 2B is a simplified block diagram of one of the remote occupancy sensors 120. The remote occupancy sensor 120 comprises a controller 230 and an occupancy detector circuit 232, which provides the controller with an occupancy control signal $V_{OCC}$ representative of whether the space is occupied or not. The controller 230 receives an ambient light level control signal $V_{AMB}$ representative of the level of ambient light around the occupancy sensor from the ambient light detector 234. A plurality of actuators 236 provide user inputs to the occupancy sensor 120 for use during configuration and installation of the lighting control system 100 as will be described in greater detail below. The controller 230 is operable to illuminate a plurality of visual indicators 238, e.g., light-emitting diodes (LEDs), to provide feedback to the user during configuration and installation of the occupancy sensor 120.

According to a first embodiment of the present invention, the occupancy sensors 120 are each operable to store in a memory 240 the values of the various operating characteristics of the lighting control system 100, e.g., the occupancy voltage threshold, the ambient light level threshold, and the occupancy sensor timeout period $T_{TIMEOUT}$. The memory 240 may be implemented as an external integrated circuit (IC) or as an internal circuit of the controller 230. To adjust the values of the operating characteristics, the user must access the occupancy sensor 120 to actuate the actuators 236. The occupancy sensors 120 use the operating characteristics to change between the occupied state and the vacant state as will be described in greater detail below. The occupancy sensors 120 also store the serial number in the memory 240. The serial number may be programmed into the memory 240, for example, during manufacture of the occupancy sensor 120.

The remote occupancy sensor 120 further comprises an RF transmitter 242 coupled to the controller 230 and an antenna 244. In response to determining an occupancy or a vacancy condition of the space, the controller 230 causes the RF transmitter 242 to transmit a digital message to the dimmer switch 110 via the RF signals 106. Each transmitted message comprises the serial number of the remote occupancy sensor 120 and the appropriate command dependent upon the various operating characteristics of the occupancy sensor and the magnitudes of the occupancy control signal $V_{OCC}$ and the ambient light level control signal $V_{AMB}$. Alternatively, the RF transmitter 242 of the occupancy sensors 120 and the RF receiver 222 of the dimmer switch 110 could both comprise RF transceivers to allow for two-way communication between the occupancy sensors and the dimmer switch.

The occupancy sensor 120 also comprises two batteries: a first battery V1 and a second battery V2. The first battery V1 provides a first battery voltage $V_{CC1}$ referenced to a first circuit common, and the second battery V2 provides a second battery voltage $V_{CC2}$ referenced to a second circuit common. For example, the magnitudes of the first and second battery voltages $V_{CC1}$, $V_{CC2}$ may be the same, e.g., approximately 3 volts. The second battery V2 powers only the occupancy detector circuit 232, while the first battery V1 powers the controller 230, the RF transmitter 242, and the other circuitry of the occupancy sensor 120. Since the occupancy detector circuit 232 is powered by a separate battery from the other circuitry, the occupancy detector circuit is isolated from the noisy circuitry (e.g., the controller 230 and the RF transmitter 242) of the occupancy sensor 120 without excessive electronic filtering. Accordingly, the amount of noise present in the occupancy detector circuit 232 is dramatically reduced without the use of advanced filters.

The magnitude of the current drawn by the occupancy detector circuit 232 is approximately equal to the magnitude of the total current drawn by the other circuitry of the occupancy sensor 120. For example, the magnitude of the average current drawn from each of the batteries V1, V2 is less than approximately 7 μA. The controller 230 is operable to monitor the magnitude of the first battery voltage $V_{CC1}$ of the first battery V1 and to operate in a low-battery mode when the magnitude of the first battery voltage $V_{CC1}$ drops below a predetermined low-battery voltage threshold $V_{LOW}$. Specifically, the controller 230 transmits a digital message representative of a low-battery condition to the dimmer switch 110 when the magnitude of the first battery voltage $V_{CC1}$ drops below a predetermined low-battery voltage threshold $V_{LOW}$. The predetermined low-battery voltage threshold $V_{LOW}$ may be approximately equal to the lowest voltage able to sufficiently power the low-voltage circuitry of the occupancy sensor 120 (e.g., approximately 2.6 V for a 3.3V-microprocessor). In response to receiving the low-battery digital message, the dimmer switch 110 may, for example, blink one or more of the visual indicators 118 to indicate that the batteries V1, V2 are low. Since magnitudes of the currents drawn from the batteries V1, V2 are approximately the same, the dimmer switch 110 assumes that the magnitudes of the first and second battery voltages $V_{CC1}$, $V_{CC2}$ are decreasing in a similar fashion. Additionally, the dimmer switch 110 may disable the failsafe timer in response to receiving the low-battery digital message, such that the dimmer switch does not turn off the lighting load 104 at the end of the failsafe time period $T_{FAILSAFE}$.

Figure 3:
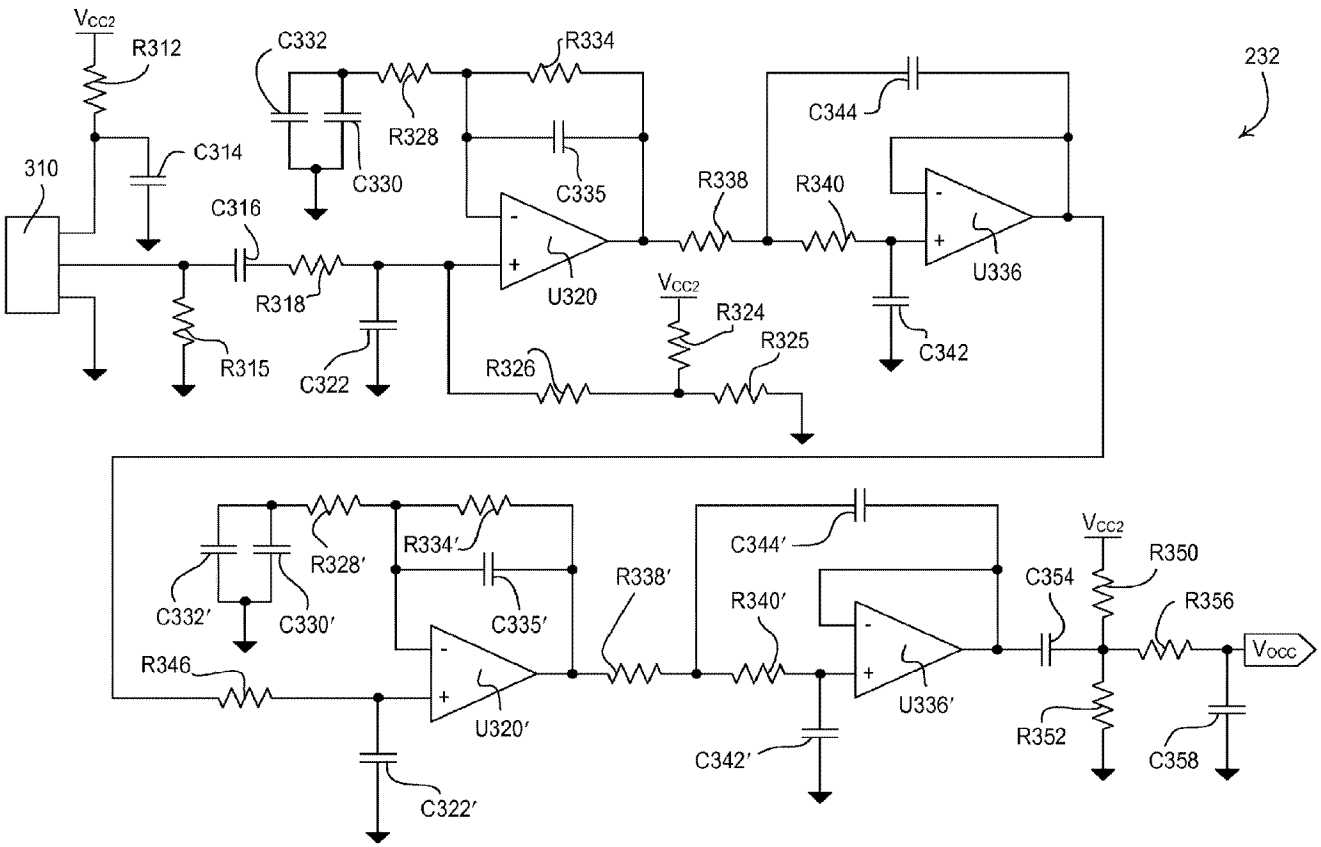
FIG. 3 is a simplified circuit diagram of an occupancy detector circuit of the occupancy sensor of FIG. 2B.

FIG. 3 is a simplified circuit diagram of the occupancy detector circuit 232. The occupancy detector circuit 232 includes the PIR detector 310, which may comprise, for example, part number LHi1128 manufactured by PerkinElmer, Inc. The PIR detector 310 receives power from the second battery V2 via a low-pass filter comprising a resistor R312 and a capacitor C314, which operate to minimize the noise introduced to the occupancy detector circuit 232 from the second battery V2. For example, the resistor R312 may have a resistance of 22Ω, and the capacitor C314 may have a capacitance of 0.01 μF. The PIR detector 310 generates an output signal characterized by a low frequency (e.g., approximately 0.3 Hz to 8 Hz) and representative of the change in infrared energy detected by the PIR detector 310. These changes in infrared energy are typically representative of the occupant moving in the space.

The output of the PIR detector 310 is pulled down towards the second circuit common by a resistor R315 (e.g., having a resistance of 1 MΩ) and is coupled to a four-stage amplifier circuit via a capacitor C316 (e.g., having a capacitance of 1 μF) and a resistor R318 (e.g., having a resistance of 10 kΩ). The first stage of the amplifier circuit comprises an operational amplifier (OP amp) U320 and has a gain of approximately 70. A non-inverting input of the OP amp U320 is coupled to the second circuit common via a capacitor C322 (e.g., having a capacitance of 0.01 μF). Two resistors R324, R325 are connected in series between the second battery voltage $V_{CC2}$ and the second circuit common and both have, for example, resistances of 1 MΩ. The non-inverting input of the OP amp U320 is coupled to the junction of the resistors R324, R325 via a resistor R326 (e.g., having a resistance of 1 MΩ). The series-combination of a resistor R328 (e.g., having a resistance of 14.3 kΩ) and a capacitor C330 (e.g., having a capacitance of 100 μF) is coupled between the inverting input of the OP amp U320 and the second circuit common. A capacitor C332 is coupled in parallel with the capacitor C330 and has, for example, a capacitance of 0.1 μF. The parallel-combination of a resistor R334 and a capacitor C335 is coupled between the inverting input and the output of the OP amp U320.

The output of the OP amp U320 is coupled to the non-inverting input of a second OP amp U336 via two resistors R338, R340 (e.g., having resistances of 118 kΩ and 845 kΩ, respectively). The inverting input of the second OP amp U336 is coupled to the output of the OP amp, such that the second OP amp operates as a buffer (i.e., forming the second stage of the amplifier circuit). The non-inverting input is coupled to the second circuit common through a capacitor C342 (e.g., having a capacitance of 0.01 μF). The junction of the two resistors R338, R340 is coupled to the output of the OP amp U336 via a capacitor C344 (e.g., having a capacitance of 0.047 μF).

The third and fourth stages of the amplifier circuit of the occupancy detector circuit 232 are similar to the first and second stages. respectively. The third stage comprises a third OP amp U320' and also has a gain of approximately 70. The output of the second OP amp U336 is connected to the non-inverting input of the third OP amp U320' via a resistor R346 (e.g., having a resistance of 1 MΩ).

The fourth stage comprises a fourth OP amp U336', which also operates as a buffer. Thus, the total gain of the occupancy detector circuit 232 is approximately 4900. The output of the fourth OP amp U336' is used to generate the occupancy control signal $V_{OCC}$, which is provided to an occupancy control signal input (e.g., an analog input) of the controller 230. Two resistors R350, R352 are connected in series between the second battery voltage $V_{CC2}$ and the second circuit common and both have, for example, resistances of 1 MΩ. A capacitor C354 is coupled between the output of the fourth OP amp U320' and the junction of the two resistors R350, R352, and has, for example, a capacitance of 1 μF. A resistor R356 is coupled between the junction of the two resistors R350, R352 and the occupancy control signal input of the controller 230 and has, for example, a resistance of 1 MΩ. The occupancy control signal input of the controller 230 is coupled to the second circuit common through a capacitor C358 (e.g., having a capacitance of 0.01 μF). The controller 230 converts the occupancy control signal $V_{OCC}$ to a digital signal using, for example, an internal analog-to-digital converter (ADC). As previously mentioned, the occupancy detector circuit 232 draws a current having a magnitude of approximately 7 μA or less from the second battery V2.

Figure 4A:
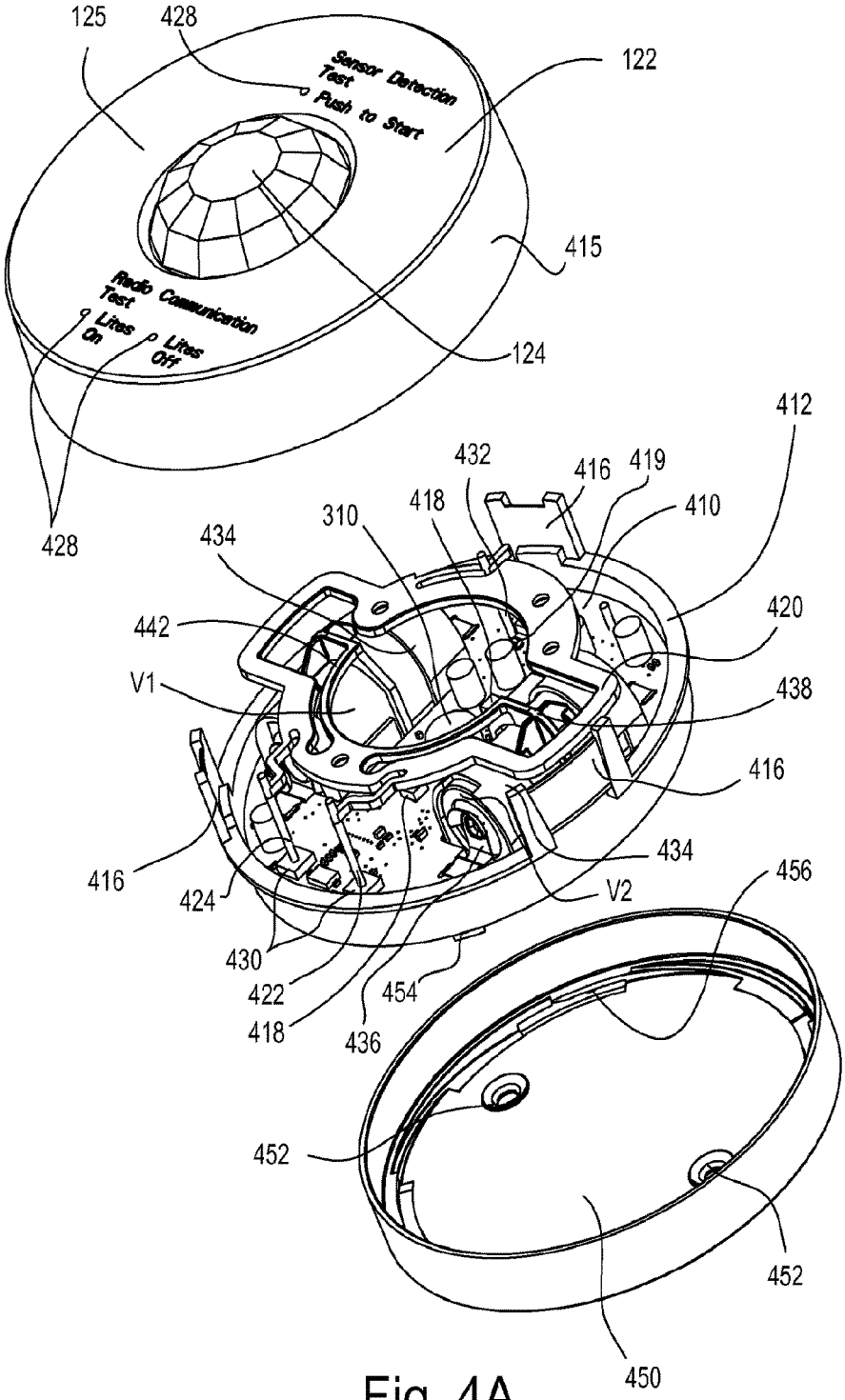
FIG. 4A is a front exploded perspective view of the occupancy sensor of FIG. 2B.
Figure 4B:
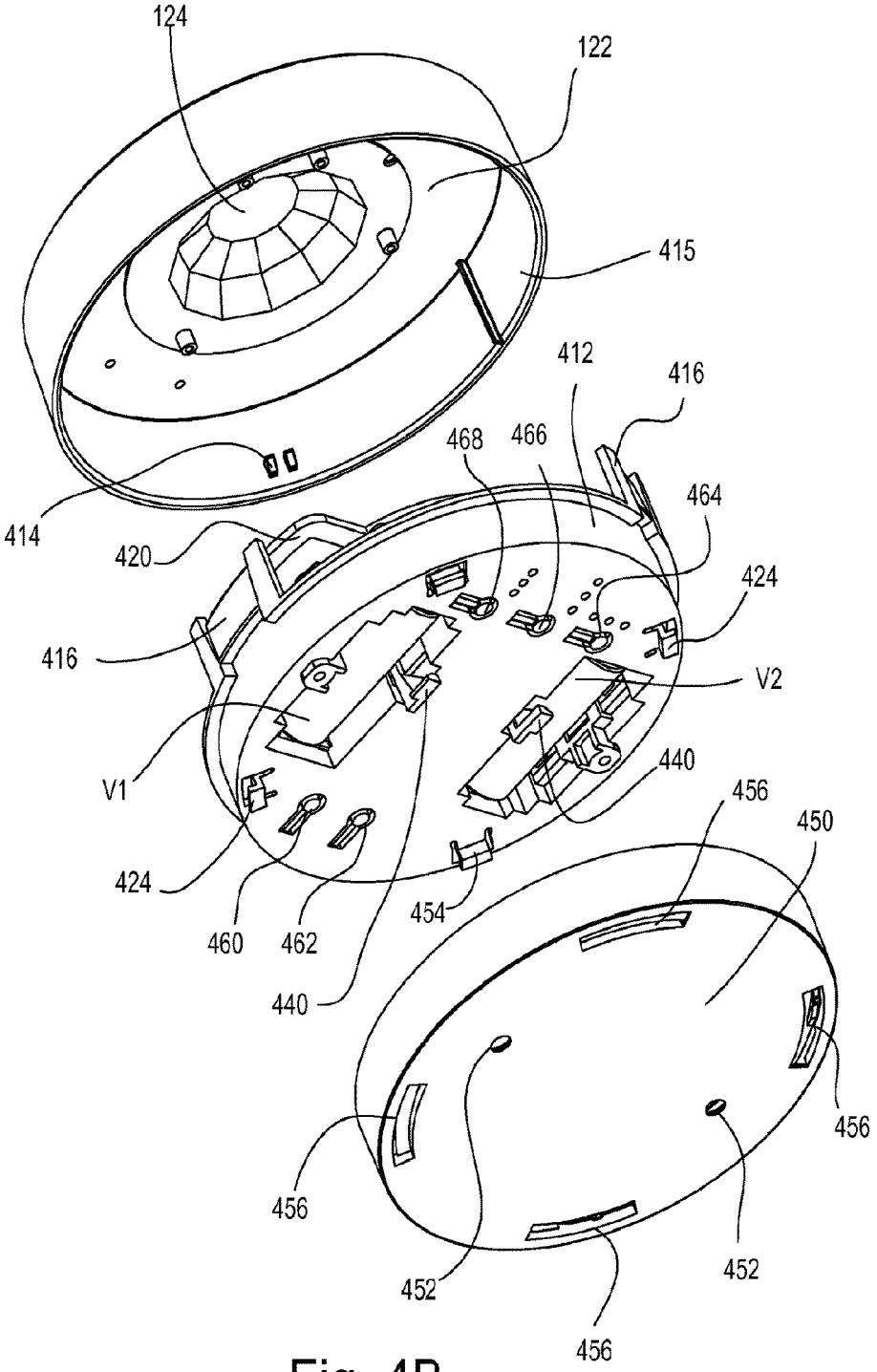
FIG. 4B is a rear exploded perspective view of the occupancy sensor of FIG. 2B.

FIG. 4A is a front exploded perspective view and FIG. 4B is a rear exploded perspective view of one of the occupancy sensors 120. The occupancy sensor 120 comprises a base portion 412 and a flat, circular mounting plate 450 (i.e., a bottom plate), which is releasably attached to the base portion. The enclosure 122 comprises an integral cylindrical wall 415 extending from the periphery of the front surface 125, such that the wall forms a shallow, plastic cup and defines a generally, flat disk-shaped volume. The mounting plate 450 is disposed in a plane parallel to the plate of the front surface 125 of the enclosure 122 and has a diameter less than the diameter of the front surface. The front surface 125 of the enclosure 122 has a diameter greater than about 3 inches and the occupancy sensor 120 has a height from the front surface to the mounting plate 450 of less than about 1.5 inches.

The circuitry of the occupancy sensor 120 is mounted to a printed circuit board (PCB) 410, which is connected to the base portion 412. The base portion 412 is adapted to be connected to the housing 122 via a plurality of tabs 414 received by snaps 416 of the base portion. The PIR detector 310 is mounted to the center of the PCB 410 and is aligned with the lens 124. When the base portion 412 is coupled to the housing 122, the lens 124 is operable to direct the infrared energy from the space towards the PIR detector 310. The visual indicators 238 of the occupancy sensor 120 comprise two LEDs 418 mounted to the PCB 410 and positioned to illuminate the lens 124 when the housing 122 is connected to the base portion 412.

Figure 4C:
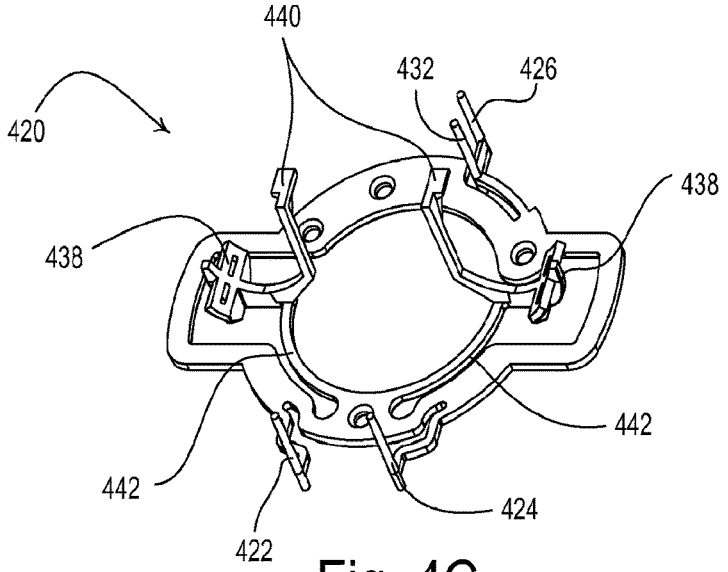
FIG. 4C is a perspective view of a multi-functional structure of the occupancy sensor of FIG. 2B.

The occupancy sensor 120 further comprises a multi-functional structure 420, which is located between the housing 122 and base portion 412. FIG. 4C is a perspective view of the multi-functional structure 420. The multi-functional structure 420 comprises actuation posts 422, 424, 426, which protrude through openings 428 in the front surface 125 of the occupancy sensor 120 to allow for actuation of tactile switches 430 on the PCB 410 from the front surface. The actuation posts 422, 424, 426 comprise a portion of the plurality of actuators 236 of the occupancy sensor 120 and are used during configuration of the lighting control system 100 to verify the operation of the occupancy sensor and the lighting control system. The multi-functional structure 420 also comprises a light pipe 432 positioned parallel to the third actuation post 426 for conducting light from a third LED 419 (i.e., one of the visual indicators 238) mounted on the PCB 410 to the front surface 125 of the occupancy sensor 120.

Figure 4D:
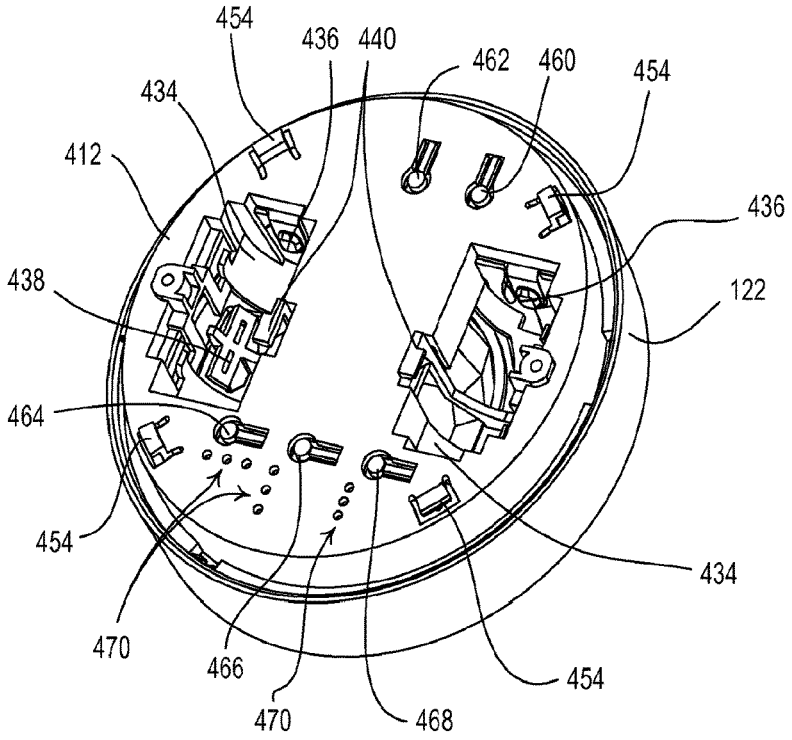
FIG. 4D is a rear perspective view of a base portion of the occupancy sensor of FIG. 2B with batteries removed.

The batteries V1, V2 are housed in battery compartments 434 of the base portion 412. FIG. 4D is a rear perspective view of the base portion with the batteries V1, V2 removed. When installed in the battery compartments 434, the batteries V1, V2 are electrically connected to the circuitry of the occupancy sensor 120 via electrical contacts 436 and are supported by battery supports 438 of the multi-functional structure 420. The multi-functional structure 420 further comprises battery-removal tabs 440 that aid in removing the batteries V1, V2 from the battery compartments 434. When the tabs 440 are pulled away from the base portion 412, flexible arms 442 of the multi-functional structure 420 flex, such that the battery supports 438 force the batteries V1, V2 out of the battery compartments 434.

As shown in FIGS. 4A and 4B, the mounting plate 450 forms a circular disk and allows the occupancy sensor 120 to be mounted to a ceiling or wall. The mounting plate 450 is first attached to the ceiling or wall via screws (not shown) received through attachment openings 452 of the mounting plate 450 and into anchors (not shown) in the ceiling or wall. The base portion 412 (along with the housing 122) is then rotated clockwise around the perimeter of the mounting plate 450, such that flanges 454 of the base portion 412 are received by attachment slots 456 of the support plate. The mounting plate 450 permits the mounting of the occupancy sensor 120 to selected positions within the space to produce optimal operation of the occupancy sensor.

The remainder of the plurality of actuators 236 of the occupancy sensor 120 are provided on the rear surface of the base portion 412 (as shown in FIGS. 4B and 4D) and comprise an assign button 460, an unassign button 462, an occupancy detection criteria (ODC) button 464, an ambient light threshold (ALT) button 466, and an occupancy sensor timeout period (OSTP) button 468. Each of the buttons 460, 462, 464, 466, 468 is formed as an integral part of the base portion 412 and comprises an actuation knob at the end of a flexible arm provided in an elongated U-shaped slot. The actuation knob of each button 460, 462, 464, 466, 468 may be depressed, thus flexing the flexible arm of the button, such that the actuation knob actuates a tactile switch (not shown) mounted to the bottom side of the PCB 410.

During configuration of the lighting control system 100, the user may simultaneously press and hold the toggle actuator 114 of the dimmer switch 110 and the assign button 460 of one of the occupancy sensors 120 to link the dimmer switch and the one of the occupancy sensors. The user may also simultaneously press and hold the toggle actuator 114 of the dimmer switch 110 and the unassign button 462 of the occupancy sensor 120 to unassign the occupancy sensor from the dimmer switch. The lighting control system 100 may comprise a plurality of occupancy sensors 120 that may all be assigned to one dimmer switch 110, such that the dimmer switch is responsive to each of the occupancy sensors. The user simply needs to repeat the assignment procedure for each of the plurality of occupancy sensors 120.

The occupancy detection criteria button 464, the ambient light threshold button 466, and the occupancy sensor timeout period button 468 allow for adjustment of various characteristics of the occupancy sensor 120. Consecutive actuations of the occupancy detection criteria button 464 cause the controller 230 to adjust an occupancy detection criteria, used to determine whether the space is occupied, between a number of values, i.e., settings (e.g., three values). For example, actuations of the occupancy detection criteria button 464 may cause the controller 230 to adjust the predetermined occupancy voltage threshold to which the magnitude of the occupancy control signal $V_{OCC}$ is compared between a minimum value, a middle value, and a maximum value. Alternatively, actuations of the occupancy detection criteria button 464 may cause the controller 230 to adjust a gain applied to the occupancy control signal $V_{OCC}$ before the magnitude of the occupancy control signal $V_{OCC}$ is compared to the occupancy voltage threshold. Similarly, the ambient light threshold button 466 and the occupancy sensor timeout period button 468 allow the user to adjust the values of the ambient light threshold and the occupancy sensor timeout period $T_{TIMEOUT}$, respectively. A portion of the visual indicators 238 (i.e., additional LEDs) are mounted to the bottom side of the PCB 410 and shine through openings 470 in the base portion 412. The visual indicators 238 mounted to the bottom side of the PCB 410 are illuminated by the controller 230 to distinguish which of the values of the occupancy detection criteria, the ambient light threshold and the occupancy sensor timeout period $T_{TIMEOUT}$ are selected.

Figure 5:
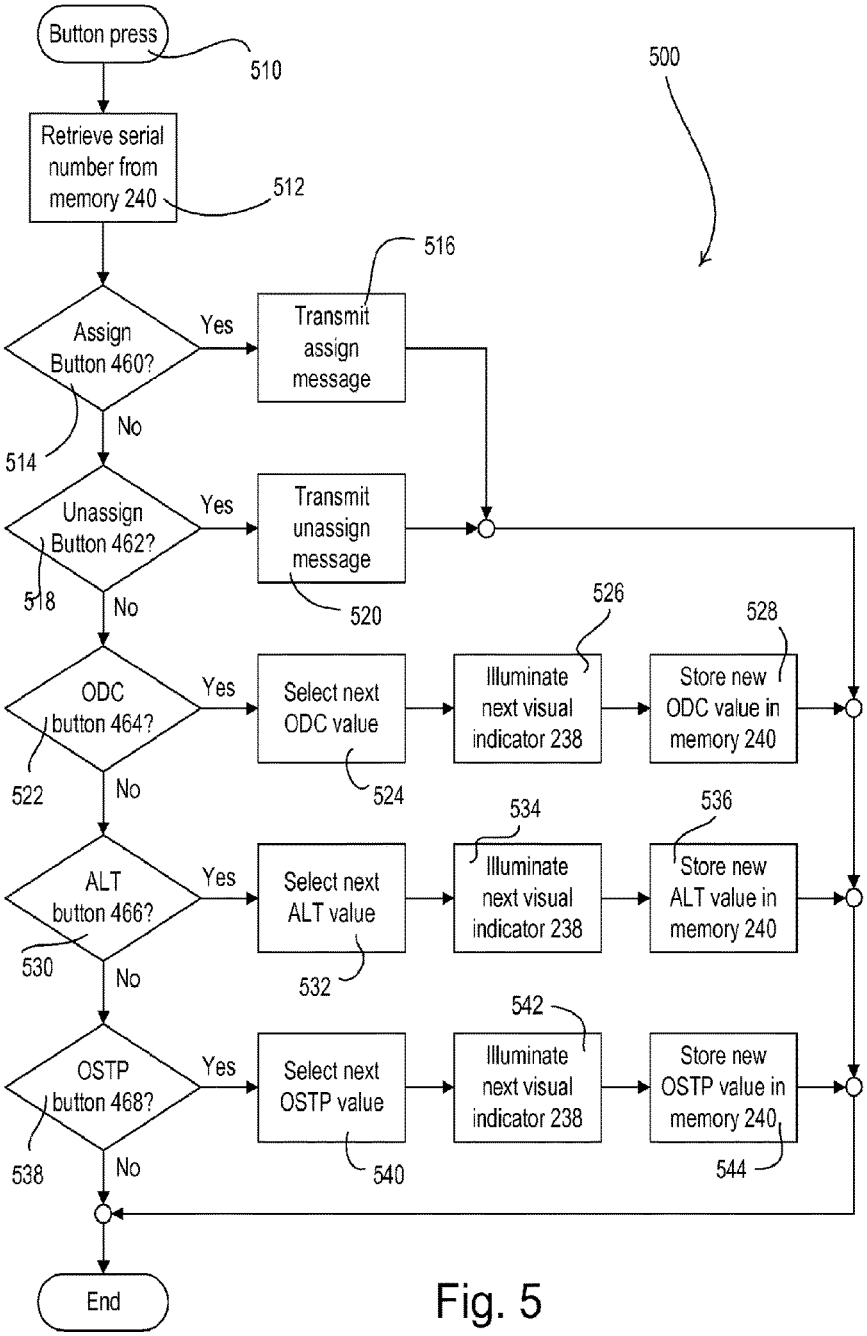
FIG. 5 is a flowchart of a rear actuator procedure executed by a controller of the occupancy sensor of FIG. 2B when an actuator on a rear surface of the base portion of FIG. 4D is pressed.

FIG. 5 is a flowchart of a rear actuator procedure 500 executed by the controller 230 of each occupancy sensor 120 when one of the actuators 460, 462, 464, 466, 486 on the rear surface of the base portion 412 is pressed at step 510. First, the serial number of the occupancy sensor 120 is retrieved from the memory 240 at step 512, such that the serial number can be transmitted in a digital message to the dimmer switch 110. If the assign button 460 is pressed at step 514, an assign message (including the serial number) is transmitted to the dimmer switch 110 at step 516 and the rear actuator procedure 500 exits. Similarly, if the unassign button 462 is pressed at step 518, an unassign message (including the serial number) is transmitted to the dimmer switch 110 at step 520, before the rear actuator procedure 500 exits.

If neither the assign button 460 nor the unassign button 462 is being pressed at steps 514 and 518, the controller 230 determines whether the occupancy detection criteria button 464, the ambient light threshold button 466, or the occupancy sensor timeout period button 468 is being pressed. Specifically, if the occupancy detection criteria button 464 is pressed at step 522, the controller 230 selects the next of the three selectable values for the occupancy detection criteria at step 524. At step 526, the controller 230 illuminates the next of the three visual indicators 238 (that are linearly arranged next to the occupancy detection criteria button 464 as shown in FIG. 4D). The controller 230 then stores the new value of the occupancy detection criteria in the memory 240 at step 528. If the ambient light threshold button 466 is pressed at step 530, the controller 230 selects the next value for the ambient light threshold at step 532, illuminates the next of the visual indicators 238 at step 534, and stores the new ambient light threshold value in the memory 240 at step 536. If the occupancy sensor timeout period button 468 is pressed at step 538, the controller 230 selects the next value for the occupancy sensor timeout period $T_{TIMEOUT}$ at step 540, illuminates the next of the visual indicators 238 at step 542, and stores the new value of the occupancy sensor timeout period $T_{TIMEOUT}$ in the memory 240 at step 544.

Figure 6A:
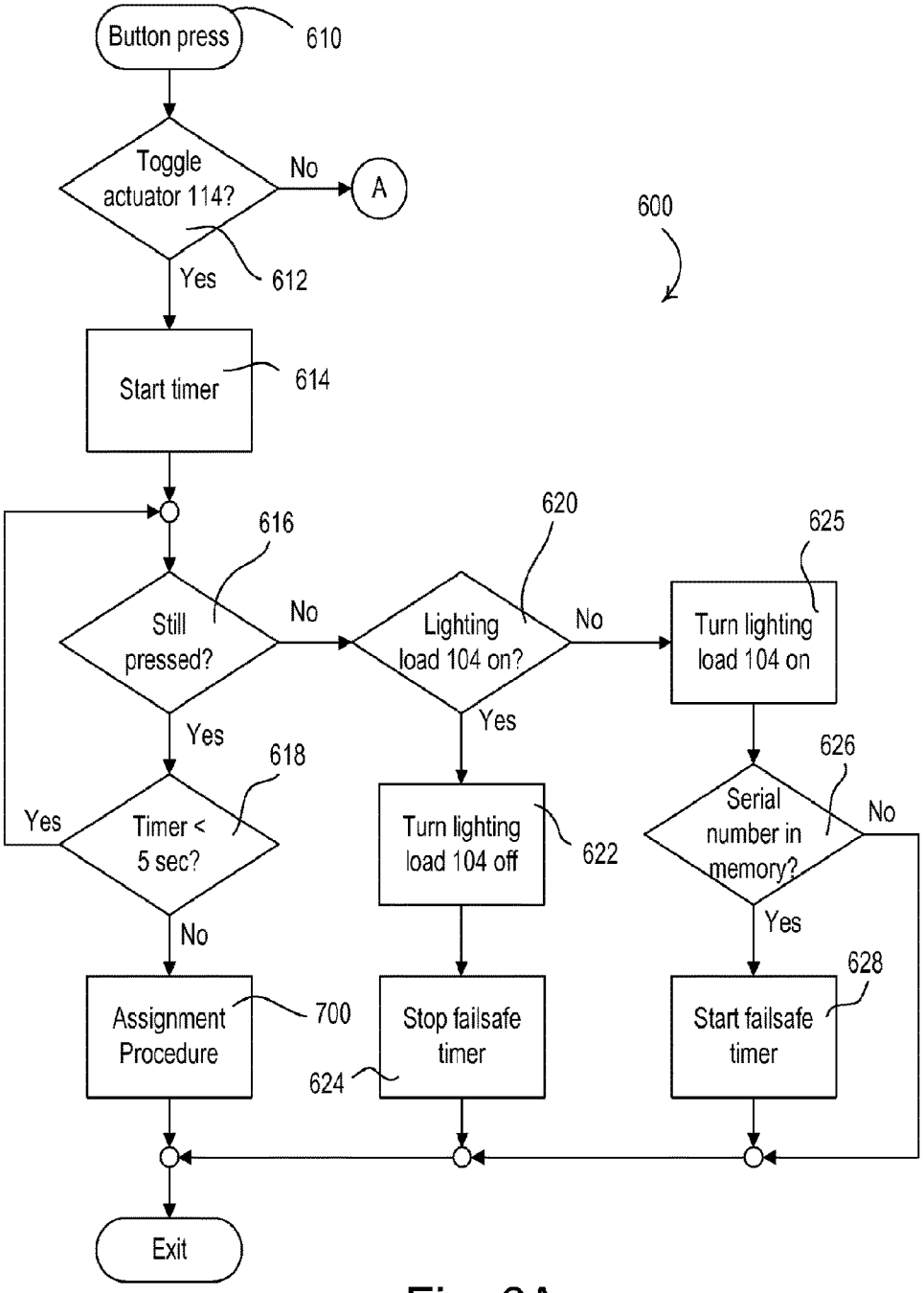
FIGS. 6A and 6B is a simplified flowchart of a dimmer actuator procedure executed by a controller of the dimmer switch of FIG. 2A.
Figure 6B:
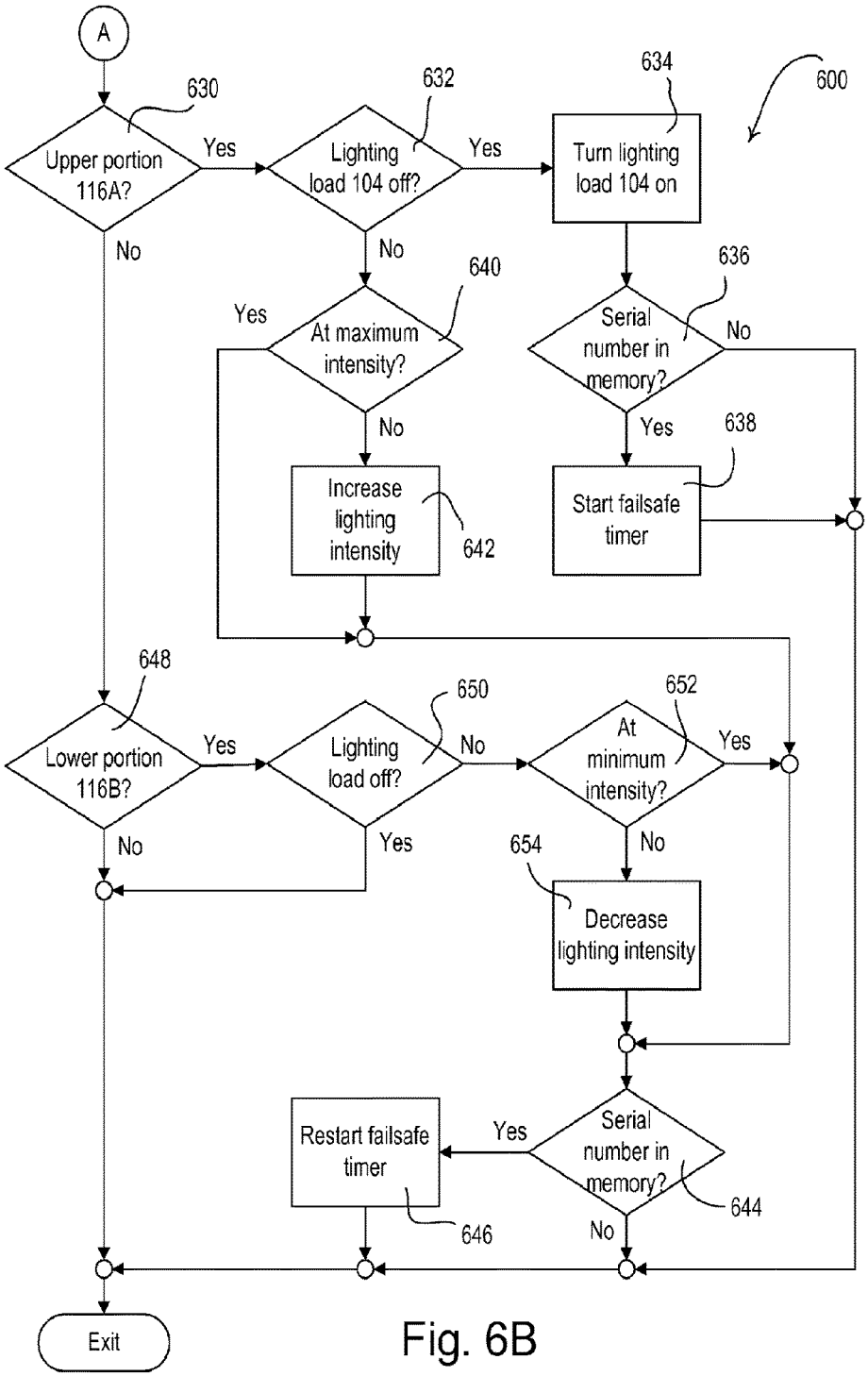

FIGS. 6A and 6B are simplified flowcharts of a dimmer actuator procedure 600 executed by the controller 214 of the dimmer switch 110 in response to an actuation of the toggle actuator 114 or the intensity adjustment actuator 116 at step 610. If the toggle actuator 114 is actuated at step 612, the controller 214 initializes a button timer to zero seconds and starts the button timer increasing with respect to time at step 614. The button timer is used to determine how long the toggle actuator 114 is pressed. If the toggle actuator 114 is still being pressed at step 616, a determination is made as to whether the button timer is less than a predetermined button hold time, e.g., five (5) seconds, at step 618. The dimmer actuator procedure 600 loops until either the toggle actuator 114 is released at step 616 or the button timer has exceeded the predetermined button hold time at step 618. If the toggle actuator 114 is still pressed at step 616 and the button timer is greater than the predetermined button hold time at step 618, the controller 214 executes an assignment procedure 700, which will be described in greater detail below with reference to FIG. 7.

During the assignment procedure 700, the dimmer switch 110 may be assigned to one or more occupancy sensors 120. Specifically, the controller 214 is operable to store the serial numbers of the assigned occupancy sensors 120 in the memory 216. Thereafter, the controller 214 is responsive to digital messages received from the assigned occupancy sensors 120. If the dimmer switch 110 is assigned to at least one occupancy sensor 120, the controller 214 starts the failsafe timer whenever the lighting load 104 is toggled from off to on.

Referring back to FIG. 6A, if the toggle actuator 114 is released at step 616 while the button timer is less than the predetermined button hold time at step 618, the controller 214 controls the lighting load 104 appropriately. Specifically, if the lighting load 104 is on at step 620, the controller 214 turns the lighting load off at step 622 and stops the failsafe timer at step 624, before the dimmer actuator procedure 600 exits. If the lighting load 104 is off at step 620, the controller 214 turns the lighting load on at step 625. If there is a serial number of one of the occupancy sensors 120 stored in the memory 216 at step 626, the controller 214 starts the failsafe timer at step 628 and the dimmer actuator procedure 600 exits.

Referring to FIG. 6B, if the toggle actuator 114 is not pressed at step 612. but the upper portion 116A of the intensity adjustment actuator 116 is pressed at step 630, a determination is made as to whether the lighting load 104 is off at step 632. If the lighting load 104 is off at step 632, the controller 214 turns the lighting load on to the minimum intensity at step 634. If there is a serial number of an occupancy sensor 120 stored in the memory 216 at step 636, the controller 214 starts the failsafe timer at step 638 and the dimmer actuator procedure 600 exits. If the lighting load 104 is on at step 632 and the dimmer switch 110 is not at the maximum intensity at step 640, the controller 214 increases the lighting intensity of the lighting load 104 by a predetermined increment at step 642. If the dimmer switch 110 is at the maximum intensity at step 640, the controller 214 does not adjust the lighting intensity. If there is a serial number of an occupancy sensor 120 stored in the memory 216 at step 644, the controller 214 restarts the failsafe timer at step 646 and the dimmer actuator procedure 600 exits.

If the lower portion 116B of the intensity adjustment actuator 116 is pressed at step 648 and the lighting load 104 is off at step 650, the dimmer actuator procedure 600 exits. If the lighting load 104 is on at step 650 and the dimmer switch 110 is not at the minimum intensity at step 652, the controller 214 decreases the lighting intensity by a predetermined increment at step 654. If the dimmer switch 110 is at the minimum intensity at step 652, the controller 214 does not turn off the lighting load 104. If there is a serial number of an occupancy sensor 120 stored in the memory 216 at step 644, the controller 214 restarts the failsafe timer at step 646 and the dimmer actuator procedure 600 exits.

Figure 7:
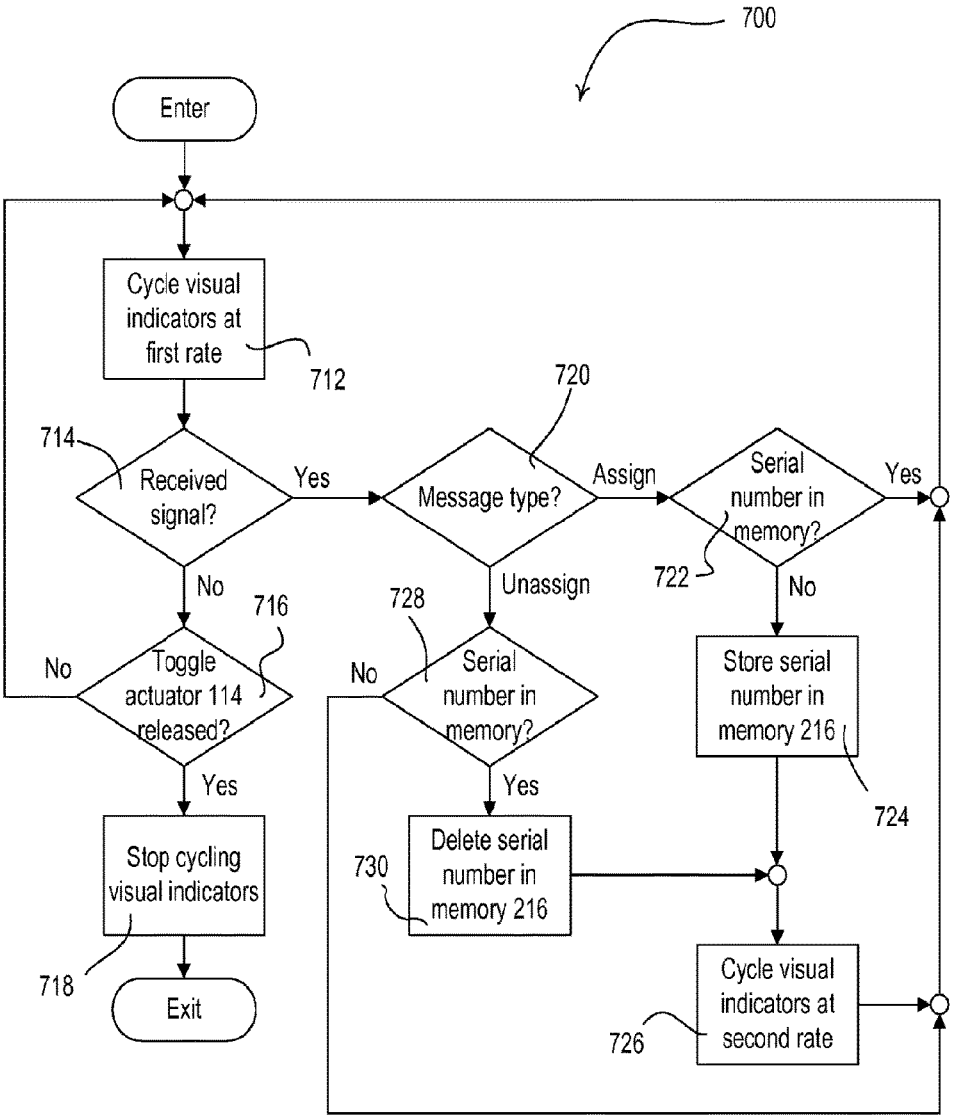
FIG. 7 is a simplified flowchart of an assignment procedure executed by the controller of the dimmer switch of FIG. 2A.

FIG. 7 is a simplified flowchart of the assignment procedure 700 executed by the controller 214 of the dimmer switch 110 if the toggle actuator 114 is pressed and held for greater than the predetermined button hold time at step 618 of the dimmer actuator procedure 600. The assignment procedure 700 is executed as long at the toggle actuator 114 is held. At step 712, the controller 214 first begins to cycle the visual indicators 118, such that the visual indicators are consecutively turned on and off at a first rate. Next, the controller 214 determines if an assign message or an unassign message has been received from an occupancy sensor 120 at step 714. The assignment procedure 700 loops until either the toggle actuator 114 is released at step 716 or either an assign message or an unassign message is received at step 714. If the toggle actuator 114 is no longer being held at step 716, the controller 214 stops cycling the visual indicators 118 at step 718 and the assignment procedure 700 exits.

When an assign message or an unassign message is received at step 714 while the toggle actuator 114 is still held, the controller 214 either stores the serial number of the received message in the memory 216 or deletes the serial number from the memory. Specifically, if the received message is an assign message at step 720, and the serial number from the received message is not already stored in the memory 216 at step 722, the controller 214 stores the serial number in the memory at step 724. The controller 214 then temporarily cycles the visual indicators 118 at a second rate (faster than the first rate) at step 726. The assignment procedure 700 then loops around such that another occupancy sensor 120 may be assigned to the dimmer switch 110. If the received message is an unassign message at step 720, and the serial number from the received message is stored in the memory 216 at step 728, the controller 214 deletes the serial number from the memory at step 730 and temporarily cycles the visual indicators 118 at the second rate at step 726.

Figure 8:
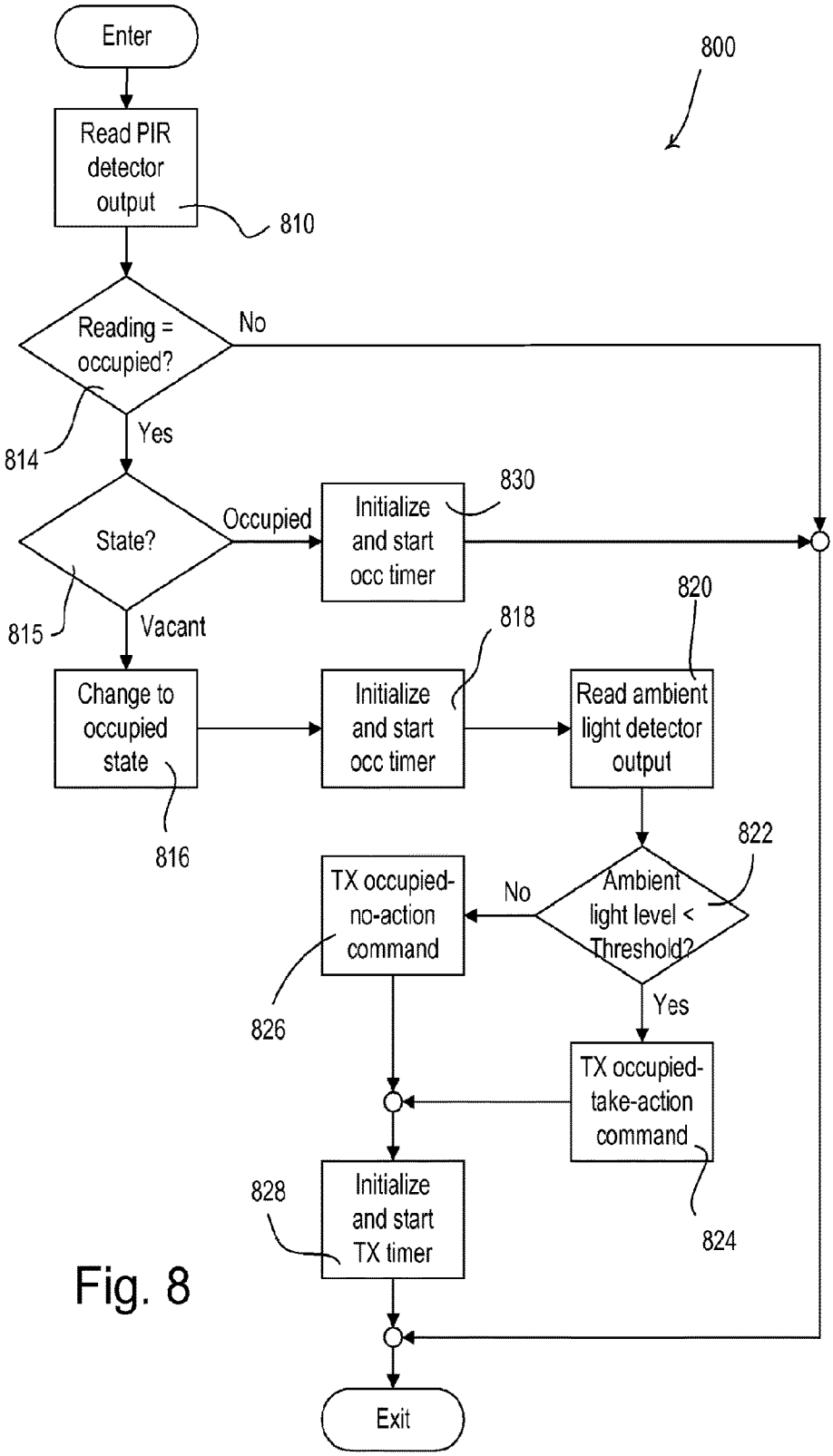
FIG. 8 is a flowchart of an occupancy detection procedure executed periodically by the controller of the occupancy sensor of FIG. 2B according to the first embodiment of the present invention.

FIG. 8 is a flowchart of an occupancy detection procedure 800 executed periodically, e.g., every 50 msec, by the controller 230 of each occupancy sensor 120. As previously, the controller 230 uses the occupancy timer to provide some delay in the adjustment of the state of the occupancy sensor. Whenever the controller 230 obtains a detector reading that signifies an occupancy condition, the controller initializes the occupancy timer to the predetermined occupancy sensor timeout period $T_{TIMEOUT}$ and starts the occupancy timer counting down. Therefore, the occupancy sensor 120 stays in the occupied state as long as the controller 230 receives indications of the occupancy condition from the PIR detector before the occupancy timer expires. However, when the occupancy timer expires, the controller 230 changes to the vacant state as will be described in greater detail below. The controller 230 also uses a transmission timer (or "TX" timer) to keep track of when to transmit the next occupied-no-action command while in the occupied state.

Referring to FIG. 8, the controller 230 first reads the output of the PIR detector circuit 232 at step 810, for example, by sampling the occupancy control signal $V_{OCC}$. The controller 230 then determines if the detector reading signifies an occupancy condition in the space, for example, by comparing the magnitude of the output voltage of the PIR detector to the predetermined occupancy voltage threshold. If the detector reading does not signify an occupancy condition in the space at step 814, the occupancy detection procedure 800 simply exits. However, if the detector reading signifies an occupancy condition at step 814 and the occupancy sensor 120 is presently in the vacant state at step 815, the controller 230 changes to the occupied state at step 816. At step 818, the controller 230 initializes the occupancy timer to the predetermined occupancy sensor timeout period $T_{TIMEOUT}$ and starts the occupancy timer (such that the occupancy timer decreases in value with time). Then, the controller 230 reads the output of the ambient light detector 234 at step 820. If the value of the ambient light level is less than the predetermined ambient light level threshold at step 822, the controller 230 transmits (TX) the occupied-take-action command at step 824. Otherwise, the controller 230 transmits the occupied-no-action command at step 826. After transmitting either of the digital messages at step 824 and 826, the controller 230 initializes and starts the transmission timer counting down at step 828 before the occupancy detection procedure 800 exits.

When the occupancy detection procedure 800 is executed and the state of the occupancy sensor 120 is occupied at step 815, the controller 230 simply initializes and starts the occupancy timer at step 830 before the occupancy detection procedure 800 exits.

Figure 9:
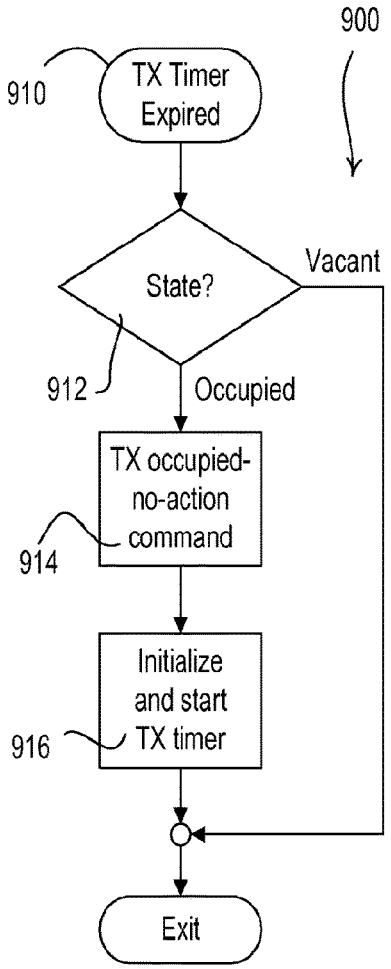
FIG. 9 is a flowchart of a transmission timer procedure executed by the controller of the occupancy sensor of FIG. 2B according to the first embodiment of the present invention.

FIG. 9 is a flowchart of a transmission timer procedure 900 executed by the controller 230 of each occupancy sensor 120 when the transmission timer expires at step 910 to allow the occupancy sensor to regularly transmit the occupied-no-action commands to the dimmer switch 110. If the occupancy sensor 120 is in the occupied state at step 912, the controller 230 transmits the occupied-no-action command to the dimmer switch 110 at step 914 and restarts the transmission timer at step 916, before the transmission timer procedure 900 exits. If the occupancy sensor 120 is in the vacant state at step 912 when the transmission timer expires at step 910, the controller 230 does not transmit any digital messages and the transmission timer procedure 900 simply exits.

Figure 10:
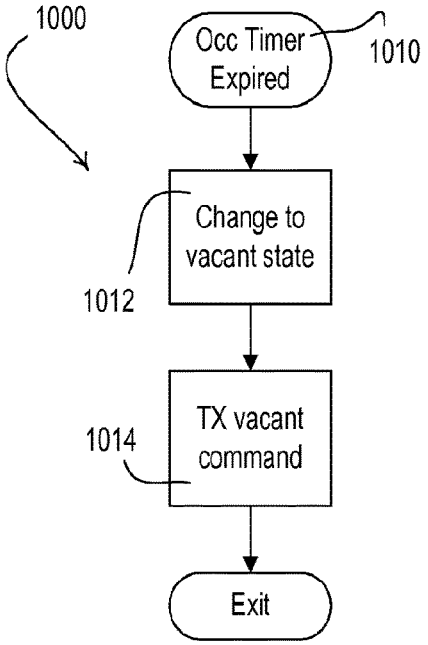
FIG. 10 is a flowchart of an occupancy timer procedure executed by the controller of the occupancy sensor of FIG. 2B according to the first embodiment of the present invention.

FIG. 10 is a flowchart of an occupancy timer procedure 1000 executed by the controller 230 of each occupancy sensor 120 when the occupancy timer expires at step 1010, i.e., when the occupancy sensor has determined that the space is unoccupied. Specifically, the controller 230 changes to the vacant state at step 1012 and transmits the vacant command to the dimmer switch 110 at step 1014 before the occupancy timer procedure 1000 exits.

Figure 11A:
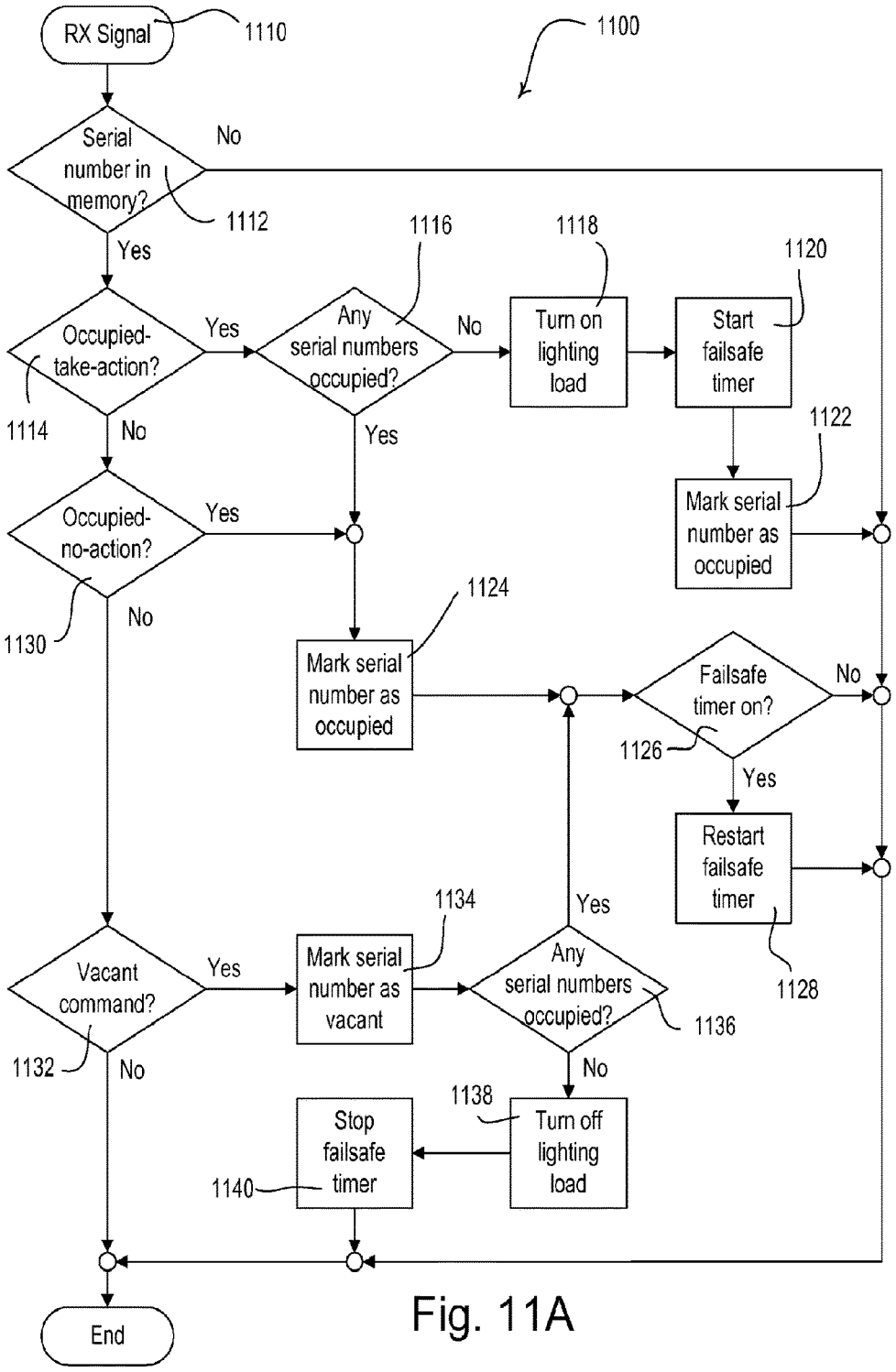
FIG. 11A is a flowchart of a received message procedure executed by the controller of the dimmer switch of FIG. 2A according to the first embodiment of the present invention.

FIG. 11A is a simplified flowchart of a received message procedure 1100 (or "RX" procedure) executed by the controller 214 of the dimmer switch 110 in response to receiving a digital message from one of the occupancy sensors 120 at step 1110. The controller 214 keeps track of the states of the occupancy sensor 120 to which the dimmer switch 110 is assigned in response to the digital messages received from the occupancy sensors. Specifically, if the controller 214 receives an occupied-take-action command or an occupied-no-action command from an occupancy sensor 120, the controller marks the serial number of the occupancy sensor as "occupied" in the memory 216. If the controller 214 receives a vacant message from the occupancy sensor 120, the controller marks the serial number of the occupancy sensor as "vacant" in the memory 216. The controller waits for a vacant command from all of the occupancy sensors to which the dimmer switch 110 is assigned before turning off the lighting load 104. However, if the failsafe timer expires, the controller 214 marks all of the serial numbers stored in the memory 216 as vacant and turns the lighting load 104 off.

Referring to FIG. 11A, after receiving the digital message at step 1110, the controller 214 first determines whether the serial number provided in the received digital message is stored in the memory 216 at step 1112. If not, the controller 214 does not process the received digital message and the received message procedure 1100 exits. If the serial number of the received digital message is stored in the memory 216 at step 1112 and the received digital message is an occupied-take-action command at step 1114, the controller 214 determines if any of the serial numbers stored in the memory 216 are marked as occupied at step 1116 to determine if the space is occupied or vacant. If there are no serial numbers marked as occupied at step 1116 (i.e., the space has just become occupied), the controller 214 controls the controllably conductive device 210 to turn on the lighting load 104 at step 1118 and starts the failsafe timer at step 1120. The controller 214 then marks the serial number of the received digital message as occupied at step 1122 and the received message procedure 1100 exits. If there are serial numbers marked as occupied at step 1116 (i.e., the space is occupied), the controller 214 marks the serial number of the received digital message as occupied at step 1124. If the failsafe timer is presently on at step 1126, the controller 214 restarts the failsafe timer at step 1128, before the received message procedure 1100 exits.

If the received digital message is an occupied-no-action command at step 1130, the controller 214 does not adjust the amount of power delivered to the lighting load 104. The controller 214 simply marks the serial number as occupied at step 1124 and restarts the failsafe timer at step 1128 if the failsafe timer is on at step 1126. If the received digital message is a vacant command at step 1132, the controller 214 marks the serial number as vacant at step 1134. If any of the serial numbers are still marked as occupied at step 1136 (i.e., the space is still occupied), the controller 214 restarts the failsafe timer at step 1128 if the failsafe timer is on at step 1126. However, if all of the serial numbers are marked as vacant at step 1136 (i.e., the space is now vacant), the controller 214 controls the lighting load 104 off at step 1138 and stops the failsafe timer at step 1140, before the received message procedure 1100 exits.

Figure 11B:
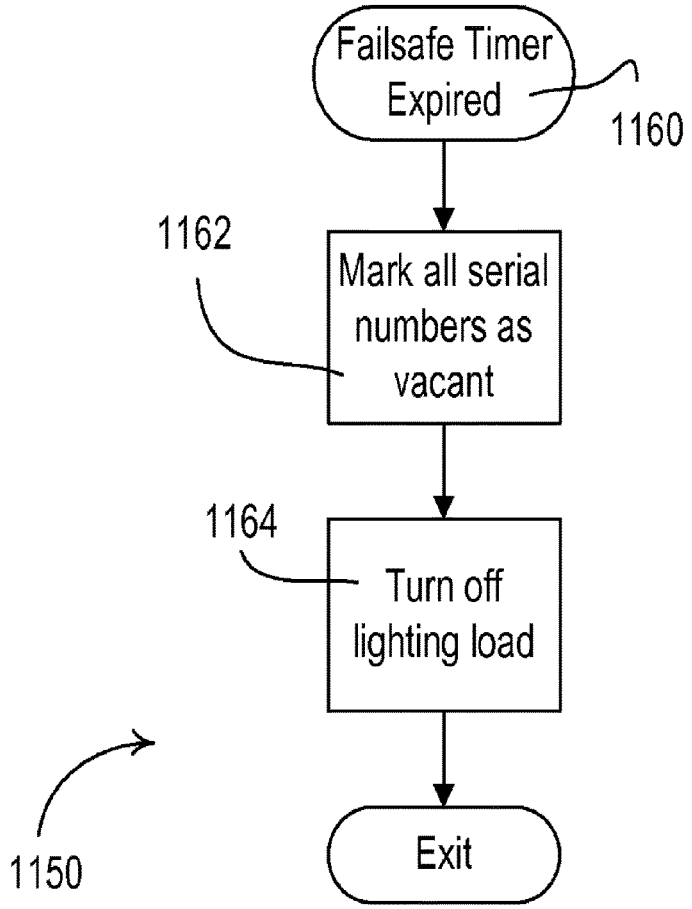
FIG. 11B is a simplified flowchart of a failsafe timer procedure executed by the controller according to the first embodiment of the present invention.

FIG. 11B is a simplified flowchart of a failsafe timer procedure 1150 executed by the controller 214 of the dimmer switch 110 when the failsafe timer expires at step 1160. The controller 214 simply marks all of the serial numbers stored in the memory 216 as vacant at step 1162 and turns off the lighting load 104 at step 1164 before the failsafe timer procedure 1150 exits.

According to a second embodiment of the present invention, the occupancy sensor 120 operates in a low-battery mode when the magnitude of the first battery voltage $V_{CC1}$ drops below the low-battery voltage threshold $V_{LOW}$. In the low-battery mode, the controller 230 halts the normal operation of the occupancy sensor 120 to conserve battery power. Specifically, the controller 230 does not transmit the occupied-take-action or occupied-no-action commands in response to determining that the room has become occupied, or transmit the vacant command in response to determining at the room has become vacant. In addition, the occupancy sensor 120 provides a visual indication of the low-battery condition by operating to illuminate the lens 124 only when the room first becomes occupied when in the low-battery mode. Accordingly, the lighting load 104 will not turn on, but the lens 124 of the occupancy sensor 120 will be illuminated only when an occupant first enters the space, thus notifying the occupant that the batteries V1, V2 are low. Further, the controller 230 does not respond to actuations of any of the actuators 236 when magnitude of the first battery voltage $V_{CC1}$ is below the low-battery voltage threshold $V_{LOW}$ (i.e., when the occupancy sensor 120 is in the low-battery mode). Alternatively, the occupancy sensor 120 could illuminate, for example, the third LED 419 when the magnitude of the first battery voltage $V_{CC1}$ drops below the low-battery voltage threshold $V_{LOW}$ and the space first become occupied.

In order to conserve additional battery power when the magnitude of the first battery voltage $V_{CC1}$ is above the low-battery voltage threshold $V_{LOW}$, the occupancy sensors 120 do not periodically transmit occupied-no-action commands to the dimmer switch 110 in the occupied state according to the second embodiment of the present invention. Specifically, the occupancy sensors 120 do not execute the transmission timer procedure 900 as shown in FIG. 9. The occupancy sensors 120 only transmit occupied messages when changing from the vacant state to the occupied state and vacant messages when changes from the occupied state to the vacant state. As a result, the dimmer switch 110 does not start the failsafe timer in response to occupied-take-action or occupied-no-action commands received from the occupancy sensor 120 (i.e., steps 1120, 1126, 1128, 1140 of the received message procedure 1100 shown in FIG. 11A are omitted). However, the dimmer switch 110 may still start and stop the failsafe timer when the lighting load 104 is controlled from off to one (and vice versa) in response to actuations of the toggle actuator 114 and the intensity adjustment actuator 116. The occupancy sensor 120 may be operable to transmit a failsafe-disable digital message to the dimmer switch 110 in the low-battery mode, such that the dimmer switch completely disables the failsafe timer when magnitude of the first battery voltage $V_{CC1}$ is below the low-battery voltage threshold $V_{LOW}$.

Figure 12A:
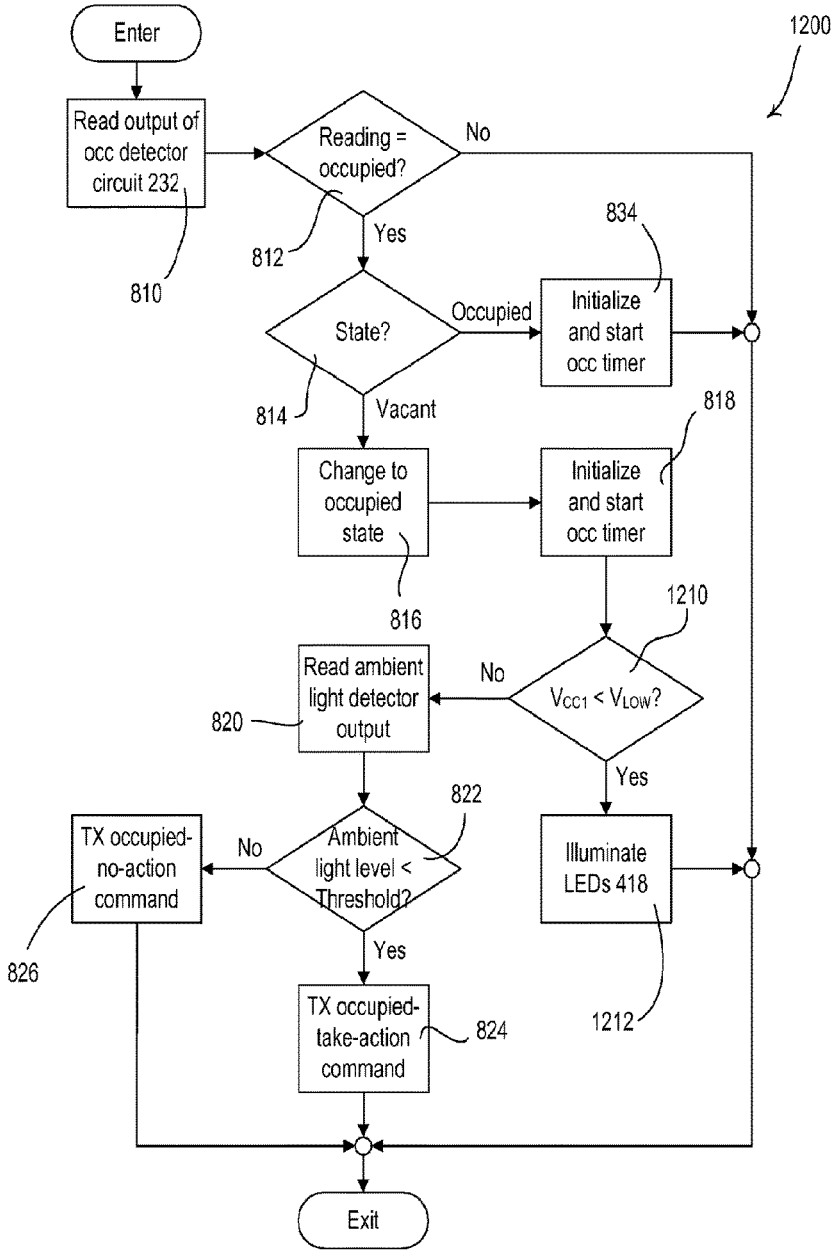
FIG. 12A is a simplified flowchart of an occupancy detection procedure according to a second embodiment of the present invention.

FIG. 12A is a simplified flowchart of an occupancy detection procedure 1200 according to the second embodiment of the present invention. The occupancy detection procedure 1200 is similar to the occupancy detection procedure 800 of the first embodiment and is also executed periodically, e.g., every 50 msec, by the controller 230 of each occupancy sensor 120. When the controller 230 detects an occupancy condition and changes to the occupied state at step 816, the controller determines if the magnitude of the first battery voltage $V_{CC1}$ is less than the predetermined low-battery voltage threshold $V_{LOW}$ at step 1210 after initializing the occupancy timer at step 818. If the first battery voltage $V_{CC1}$ is greater than or equal to the predetermined low-battery voltage threshold $V_{LOW}$ at step 1210, the occupancy sensor 120 operates normally, i.e., the controller 230 reads the output of the ambient light detector 234 at step 820 and transmits either an occupied-take-action command at step 824 or an occupied-no-action command at step 826. Note that the controller 230 does not initialize and start the transmission timer during the occupancy detection procedure 1200 of the second embodiment (i.e., as in step 828 of the occupancy detection procedure 800 of the first embodiment shown in FIG. 8).

If the first battery voltage $V_{CC1}$ is less than the predetermined low-battery voltage threshold $V_{LOW}$ at step 1210, the controller 230 illuminates the LEDs 418 to thus illuminate the lens 124 at step 1212 and the occupancy detection procedure 1200 exits. For example, the controller 230 may blink the LEDs 418 for the length of a low-battery indication time period $T_{LOW\text{-}BATT}$ (e.g., approximately ten seconds). Specifically, the controller 230 may blink the LEDs 418 by repetitively turning on the LEDs 418 for approximately 75 msec and then turning off the LEDs for approximately 425 msec during the low-battery indication time period $T_{LOW\text{-}BATT}$. Accordingly, the occupancy sensor 120 provides a visual indication that the batteries are low without transmitting any wireless commands. The occupancy sensor 230 only illuminates the LEDs 418 when the occupant first enters the space and the occupancy condition is first detected.

Figure 12B:
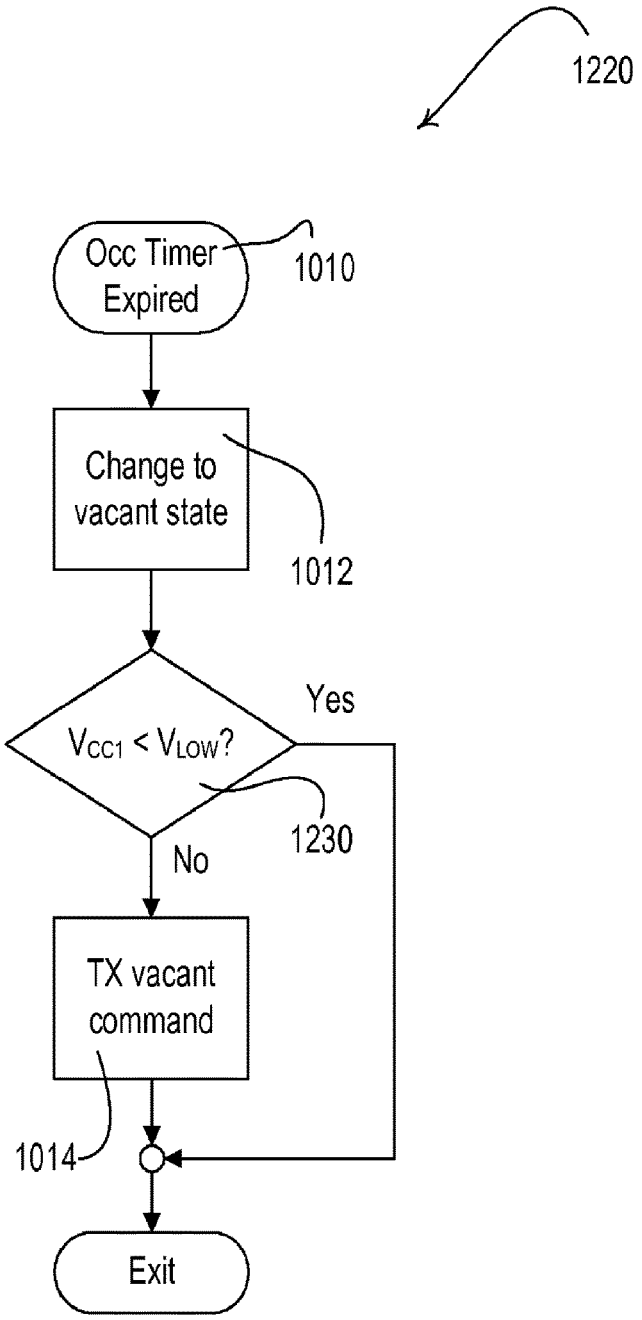
FIG. 12B is a simplified flowchart of an occupancy timer procedure according to the second embodiment of the present invention.

FIG. 12B is a simplified flowchart of an occupancy timer procedure 1220 according to the second embodiment of the present invention. The occupancy timer procedure 1220 is executed by the controller 230 of each occupancy sensor 120 when the occupancy timer expires at step 1010, i.e., when the occupancy sensor has determined that the space is unoccupied. The controller 230 first changes to the vacant state at step 1012. If the first battery voltage $V_{CC1}$ is greater than or equal to the predetermined low-battery voltage threshold $V_{LOW}$ at step 1230, the occupancy sensor 120 operates normally and transmits the vacant command at step 1014 before the occupancy timer procedure 1220 exits. If the first battery voltage $V_{CC1}$ is less than the predetermined low-battery voltage threshold $V_{LOW}$ at step 1230, the occupancy timer procedure 1220 exits without transmitting the vacant command.

According to a third embodiment of the present invention, the dimmer switch 110 is operable to store in the memory 216 the values of the various operating characteristics of the lighting control system 100, e.g., the occupancy voltage threshold, the ambient light level threshold, and the occupancy sensor timeout period $T_{TIMEOUT}$. The dimmer switch 110 may provide, for example, an advanced programming mode, such that the values of the operating characteristics may be adjusted in response to actuations of the toggle actuator 114 and the intensity adjustment actuator 116. An advanced programming mode is described in greater detail in U.S. Pat. No. 7,190,125, issued Mar. 13, 2007, entitled PROGRAMMABLE WALLBOX DIMMER, the entire disclosure of which is hereby incorporated by reference. Since the user does not need to access the occupancy sensors 120 (which may be mounted to a ceiling) to adjust the operating characteristics, the use of the toggle actuator 114 and the intensity adjustment actuator 116 of the dimmer switch 110 allows for easier adjustment of the operating characteristics.

Because the dimmer switch 110 stores the values of the operating characteristics, the occupancy sensors 120 must transmit multiple digital messages to the dimmer switch 110. For example, if the occupancy voltage threshold can be programmed to three different levels, the occupancy sensors 120 must determine occupancy in the space at all three different levels and transmit the results of all three determinations to the dimmer switch 110. The dimmer switch 110 is then able to use the result of the detections that was determined at the occupancy voltage threshold stored in the memory 216 to change between an occupied state and a vacant state and to control the lighting load 104. The dimmer switch 110 maintains an occupancy timer (or "occ" timer), such that the dimmer switch turns off the lighting load 104 after the occupancy timeout period $T_{TIMEOUT}$.

Figure 13:
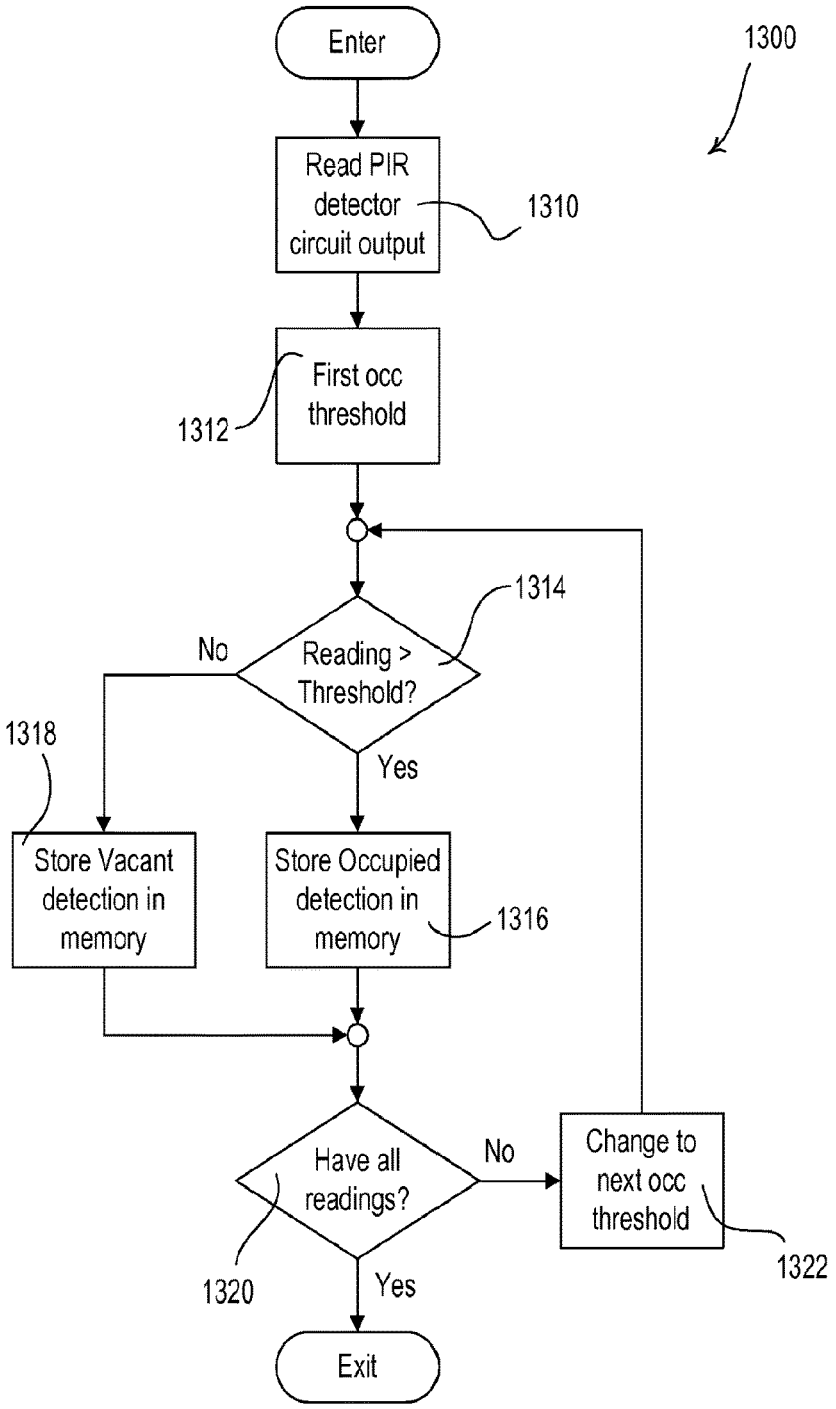
FIG. 13 is a flowchart of an occupancy detection procedure executed periodically by the controller of the occupancy sensor of FIG. 2B according to a third embodiment of the present invention.

FIG. 13 is a simplified flowchart of an occupancy detection procedure 1300 executed periodically, e.g., every 50 msec, by the controller 230 of each occupancy sensor 120 according to the third embodiment of the present invention. The controller 230 begins by sampling the output of the PIR detector circuit 232 at step 1310 and selecting the first occupancy voltage threshold at step 1312. If the sample is greater than the first occupancy voltage threshold at step 1314, the controller 230 stores an occupancy detection for the first occupancy voltage threshold in the memory 240 at step 1316. Otherwise, the controller 230 stores a vacancy detection in the memory 240 at step 1318. If the controller 230 has not determined occupancy at all of the possible values of the occupancy voltage threshold at step 1320, the controller changes to the next occupancy voltage threshold value at step 1322 and compares the reading from step 1310 to that occupancy voltage threshold at step 1314. When the controller 230 has determined occupancy for each of the possible values of the occupancy voltage threshold at step 1320, the occupancy detection procedure 1300 exits.

Figure 14:
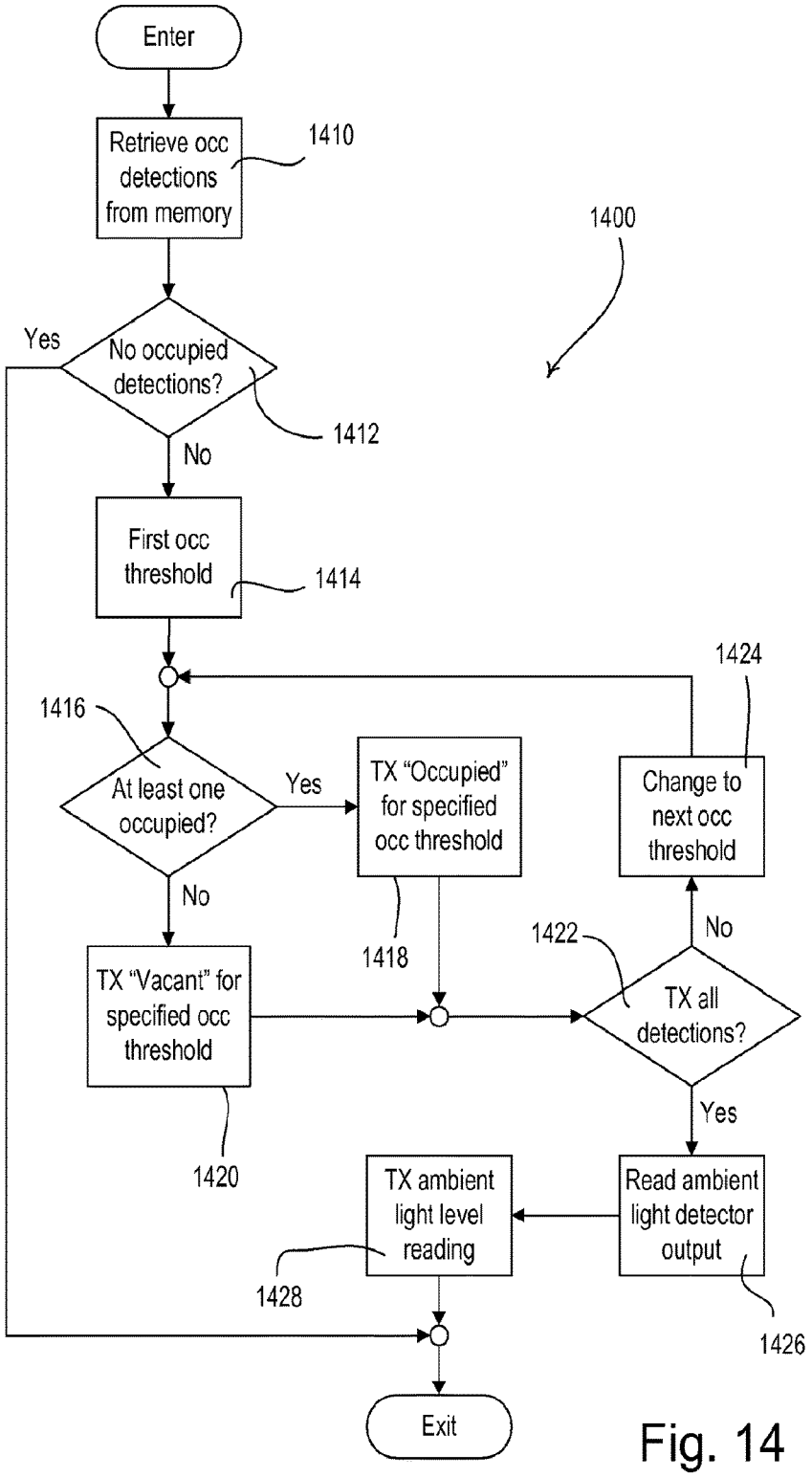
FIG. 14 is a flowchart of a transmission procedure executed by the controller of the occupancy sensor of FIG. 2B according to the third embodiment of the present invention.

FIG. 14 is a simplified flowchart of a transmission procedure 1400 executed periodically, e.g., every one minute, by the controller 230 of each occupancy sensor 120 according to the third embodiment of the present invention. First, the controller 230 retrieves the occupancy and vacancy detections from the memory 240 at step 1410. If there no occupancy detections at step 1412 (i.e., there have not been any occupancy detections in the last minute), the transmission procedure 1400 simply exits. Otherwise, the controller 230 selects the first occupancy voltage threshold at step 1414. If the occupancy sensor 120 has determined at least one occupancy detection since the last execution of the transmission procedure 1400 (i.e., in the last minute) at step 1416, the controller 230 transmits at step 1418 a digital message that indicates an occupancy detection at the first occupancy voltage threshold. If the occupancy sensor 120 did not determine at least one occupancy detection since the last execution of the transmission procedure 1400 at step 1416, the controller 230 transmits at step 1418 a digital message that indicates a Vacant detection at the first occupancy voltage threshold.

If the controller 230 has not transmitted the results of the detections for all of the possible occupancy voltage thresholds at step 1422, the controller selects the next occupancy voltage threshold at step 1424 and determines at step 1416 whether at least one occupancy detection occurred at that occupancy voltage threshold. The controller 230 then either transmits an occupancy detection at step 1418 or a vacancy detection at step 1420 for the present occupancy voltage threshold. When the controller 230 is finished transmitting all of the results of the detections for the possible occupancy voltage thresholds at step 1422, the controller 230 reads the output of the ambient light detector 234 at step 1426 and transmits the ambient light level reading to the dimmer switch 110 at step 1428 before the transmission procedure 1400 exits.

Figure 15:
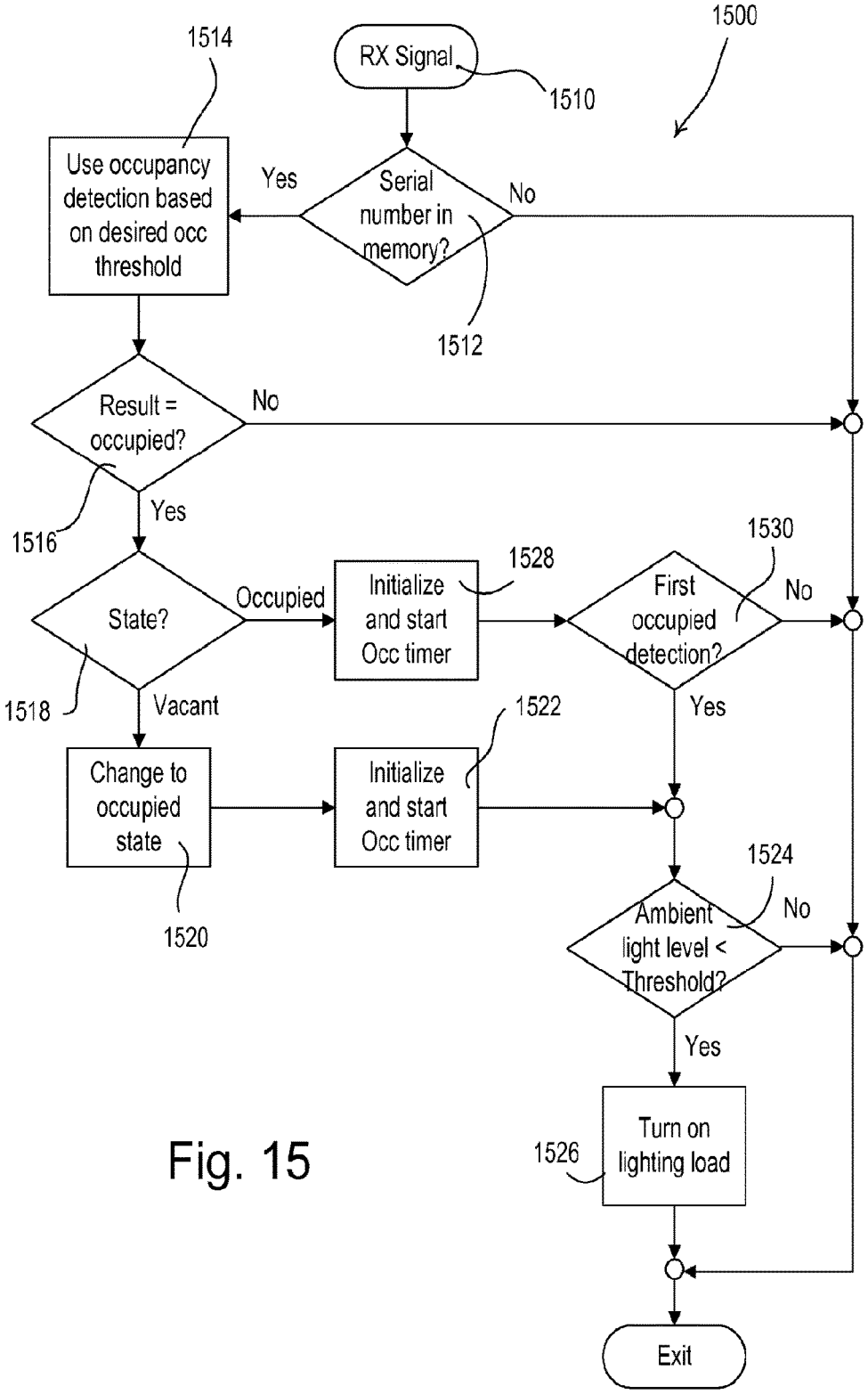
FIG. 15 is a flowchart of a received message procedure executed by the controller of the dimmer switch of FIG. 2A according to the third embodiment of the present invention.

FIG. 15 is a simplified flowchart of a received message procedure 1500 executed by the controller 214 of the dimmer switch 110 in response to receiving a digital message at step 1510. Specifically, the dimmer switch 110 may receive a number of digital messages containing the results of the detections at the various occupancy voltage thresholds and the ambient light level reading. The controller 214 first determines if the serial number of the received digital messages is stored in the memory 216 at step 1512. If not, the received message procedure 1500 simply exits. However, if the serial number is assigned to the dimmer switch 110 at step 1512, the controller 214 chooses at step 1514 to use the result of the detection at the desired occupancy voltage threshold (i.e., as chosen by the user during configuration).

If the result of the detection from step 1514 is not an occupancy detection at step 1516, the received message procedure 1500 simply exits. However, if the result of the detection is an occupancy detection at step 1516, and the dimmer switch 110 is in the vacant state at step 1518, the controller 214 changes to the occupied state at step 1520 and then initializes and starts the occupancy timer at step 1522. If the ambient light level (received in the digital messages at step 1510) is less than the ambient light level threshold stored in the memory 216 at step 1524, the controller 214 turns on the lighting load 104 at step 1526 and the received message procedure 1500 exits. If the ambient light level is not less than the ambient light level threshold at step 1524, then the received message procedure 1500 exits.

If the result of the detection is an occupancy detection at step 1516 and the dimmer switch 110 is in the occupied state at step 1518, the controller 214 restarts the occupancy timer at step 1528. If, at step 1530, the result is the first occupancy detection for the occupancy sensor 120 from which the digital messages were received at step 1512 since the dimmer switch 110 was last in the vacant state, the controller 214 determines whether the ambient light level is less than the ambient light level threshold at step 1524 and may turn on the lighting load at step 1526. Otherwise, the received message procedure 1500 simply exits.

Figure 16:
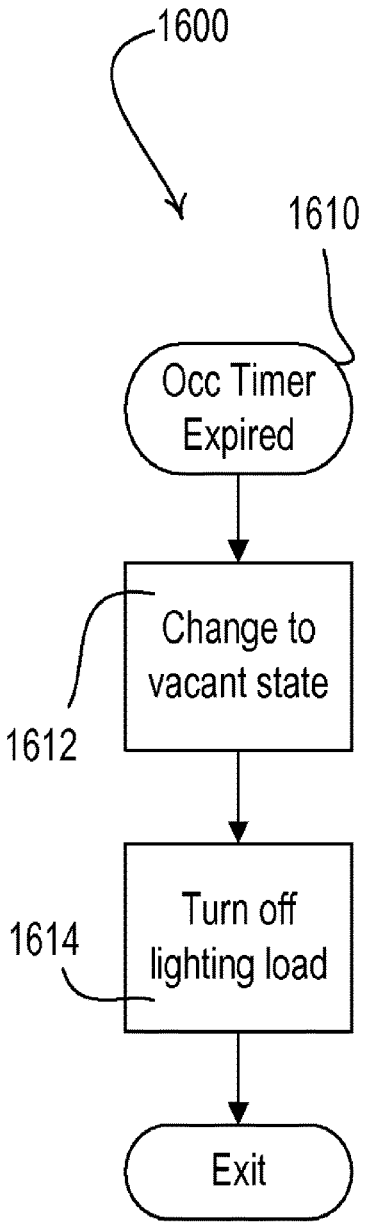
FIG. 16 is a flowchart of an occupancy timer procedure executed by the controller of the dimmer switch of FIG. 2A according to the third embodiment of the present invention.

FIG. 16 is a flowchart of an occupancy timer procedure 1600 executed by the controller 214 of the dimmer switch 110 when the occupancy timer expires at step 1610. Specifically, the controller 214 changes to the vacant state at step 1612 and turns off the lighting load 104 at step 1614 before the occupancy timer procedure 1600 exits.

Alternatively, the controller 230 of the occupancy sensor 120 could compare the ambient light level reading to three different ambient light level thresholds (e.g., high, medium, and low ambient light level thresholds) and then transmit the results of the comparisons to the dimmer switch 110 in a manner similar to that described above with response to the PIR occupancy detection comparisons. The dimmer switch 110 could then control the lighting load 104 based upon the resultant ambient light level threshold comparison corresponding to the ambient light level threshold stored in the memory 216.

Figure 17A:
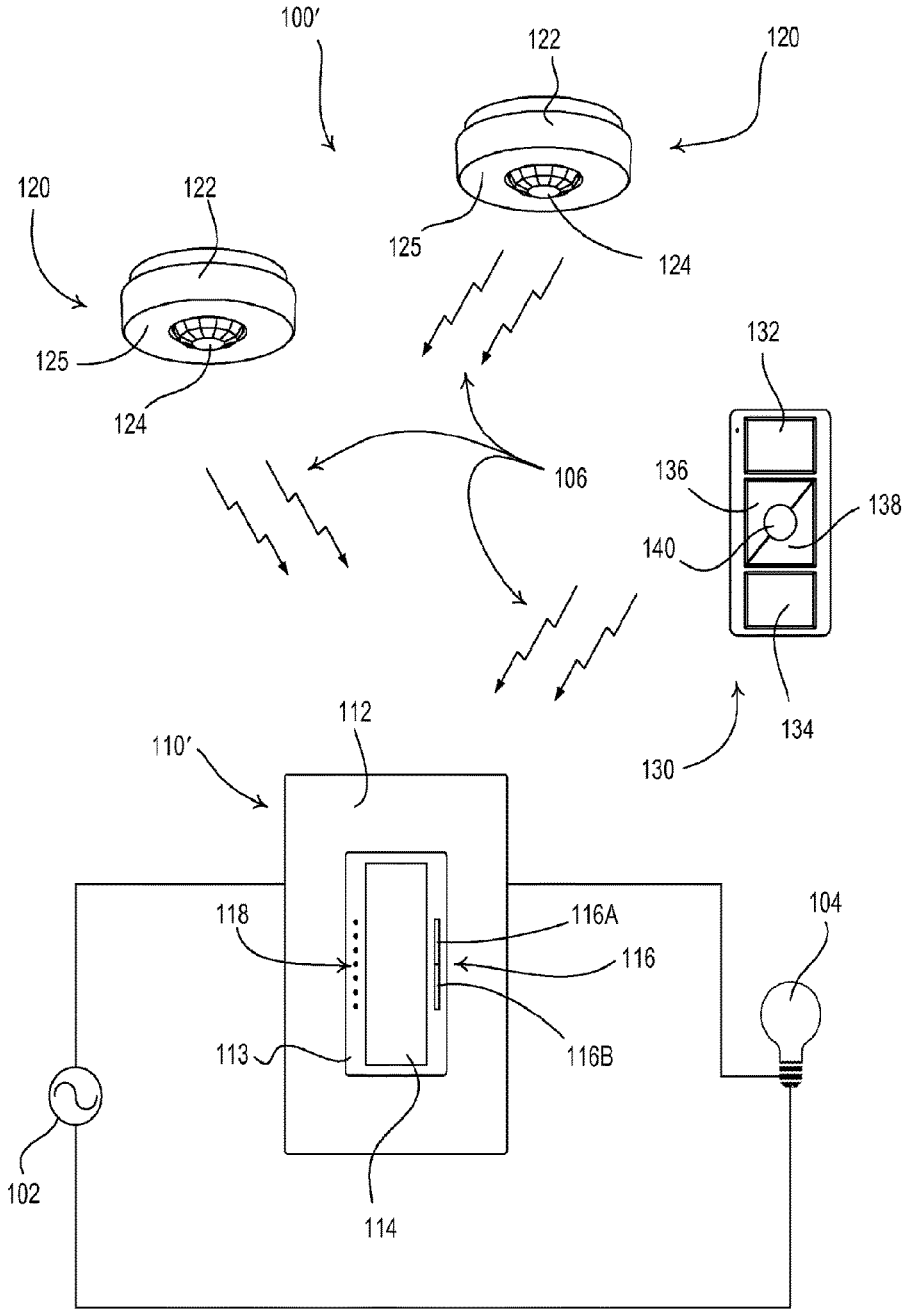
FIG. 17A is a simplified block diagram of a lighting control system having a dimmer switch, remote occupancy sensors, and a remote control for controlling the amount of power delivered to a lighting load according to a fourth embodiment of the present invention.

FIG. 17A is a simplified block diagram of a lighting control system 100' having a dimmer switch 110' according to a fourth embodiment of the present invention. The lighting control system 100' may additionally comprise one or more remote controls 130. The remote control 130 comprises a plurality of actuators: an on button 132, an off button 134, a raise button 136, a lower button 138, and a preset button 140 (for recalling a preset lighting intensity stored in the memory 216 of the dimmer switch 110'). Alternatively, the remote control 130 could comprises a plurality of preset buttons. The remote control 130 transmits digital messages via the RF signals 106 to the dimmer switch 110' in response to actuations of any of the actuators. The dimmer switch 110' is responsive to digital messages containing the serial number of the remote control 130 to which the dimmer switch is associated. The dimmer switch 110' is operable to turn on and to turn off the lighting load 104 in response to an actuation of the on button 132 and the off button 136, respectively. The dimmer switch 110' is operable to control the lighting load 104 to the preset intensity in response to an actuation of the preset button 134.

During the setup procedure of the RF load control system 100', the dimmer switch 110' is associated with one or more remote controls 130. A user simultaneously presses and holds the on button 132 on the remote control 130 and the toggle actuator 114 on the dimmer switch 110' to link the remote control 130 and the dimmer switch 110'. The user may simultaneously press and hold the off button 136 on the remote control 130 and the toggle actuator 114 on the dimmer switch 110' to unassociate the remote control 130 with the dimmer switch 110'. The configuration procedure for associating the remote control 130 with the dimmer switch 110' is described in greater detail in co-pending commonly-assigned U.S. patent application Ser. No. 11/559,166, filed Nov. 13, 2006, entitled RADIO-FREQUENCY LIGHTING CONTROL SYSTEM, the entire disclosure of which is hereby incorporated by reference.

Figure 17B:
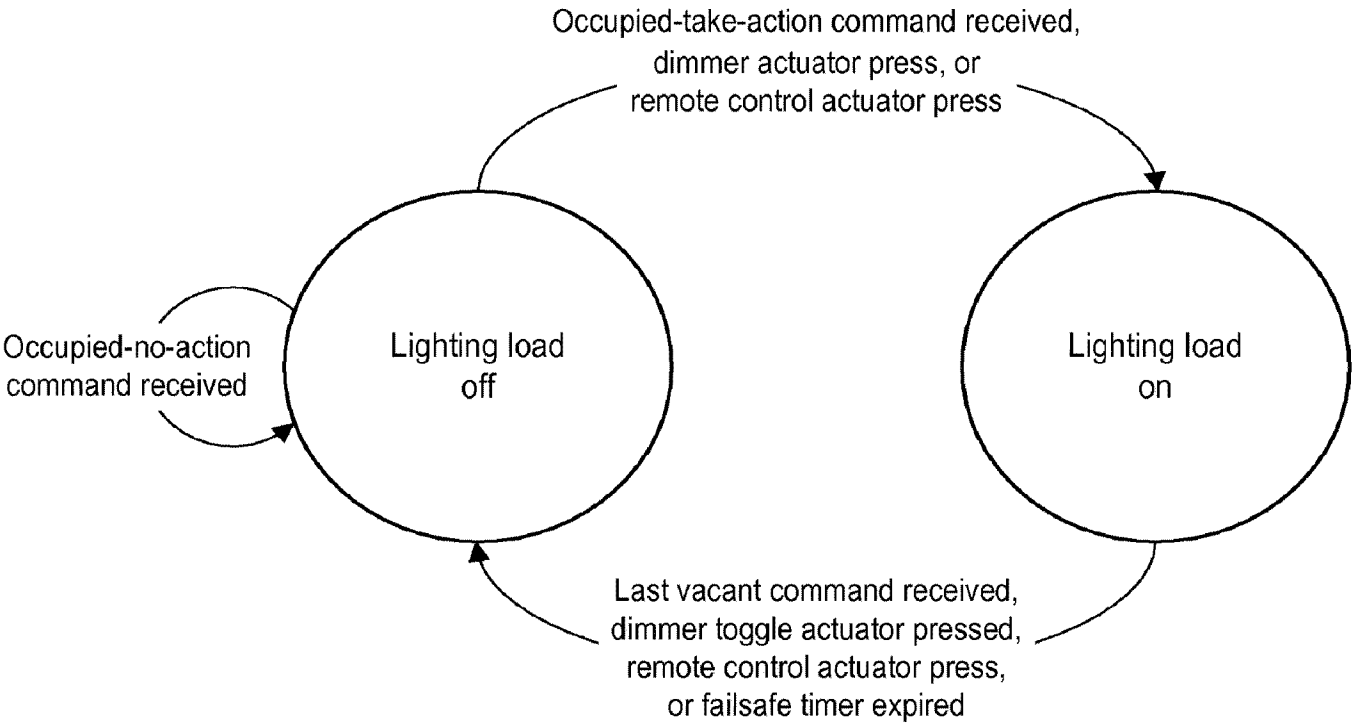
FIG. 17B is a simplified state diagram illustrating how the dimmer switch of the RF lighting control system of FIG. 17A controls the lighting load.

FIG. 17B is a simplified state diagram illustrating how the dimmer switch 110' of the lighting control system 100' controls the state of the lighting load 104 (i.e., between on and off). The dimmer switch 110' turns on the lighting load 104 when the first occupied-take-action command is received from one of the occupancy sensors 120, when one of the dimmer actuator buttons (i.e., the toggle actuator 114 and the intensity adjustment actuator 116) is actuated to turn on the lighting load, or when digital messages are received from the remote control 130, i.e. when one of the remote control actuators (e.g., the on button 132, the raise button 136, or the preset button 140 of the remote control) is actuated to turn on the lighting load 104. Further, the dimmer switch 110 turns off the lighting load 104 when the last vacant command is received from the occupancy sensors 120, when one of the dimmer actuator buttons is actuated to turn off the lighting load 104, when the failsafe timer expires, or when digital messages are received from the remote control 130, i.e. when one of the remote control actuators (e.g., the off button 134 of the remote control) is actuated to turn off the lighting load.

Figure 17C:
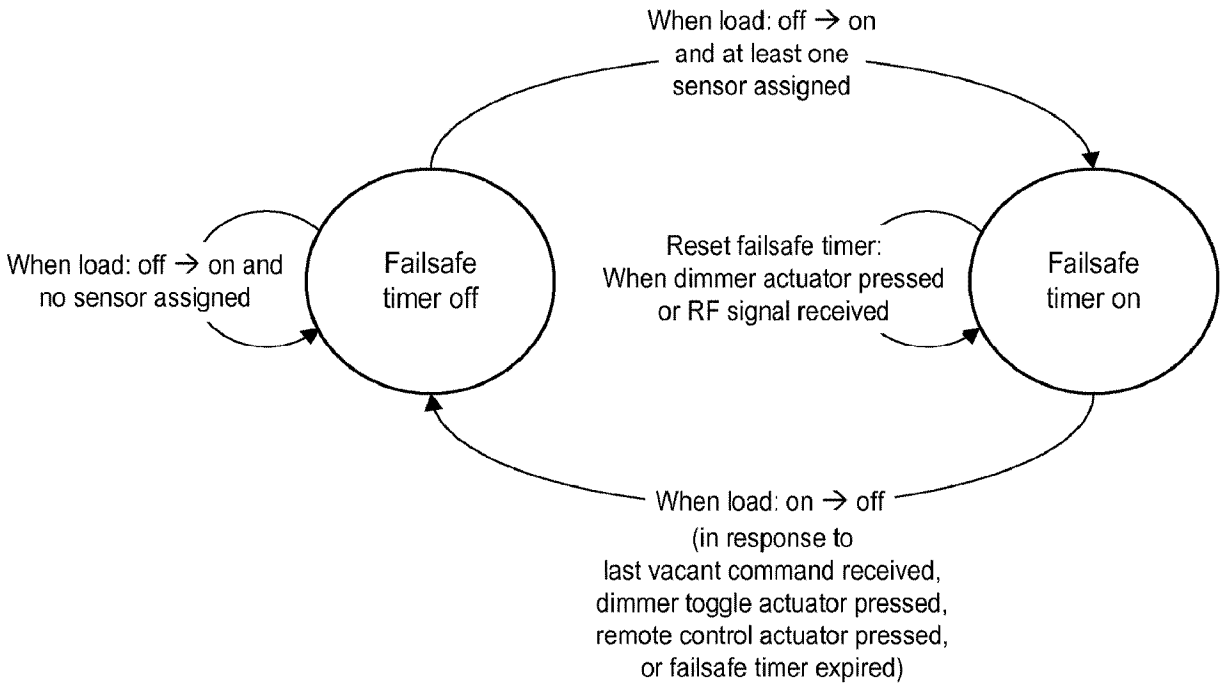
FIG. 17C is a simplified state diagram illustrating the state of a failsafe timer of one of the occupancy sensors of the RF lighting control system of FIG. 17A.

FIG. 17C is a simplified state diagram illustrating the state of the failsafe timer of the dimmer switch 110', which is similar to the state diagram of the failsafe timer as shown in FIG. 1C according to the first embodiment of the present invention. However, the dimmer switch 110' of the lighting control system 100' additionally starts the failsafe timer when digital messages to turn on the lighting load 104 are received from the remote control 130 and at least one occupancy sensor 120 is assigned to the dimmer switch 110'. The dimmer switch 110' restarts the failsafe timer when digital messages are received from any of the occupancy sensors 120 or remote controls 130 to which the dimmer switch is assigned. The dimmer switch 110' is also operable to stop the failsafe timer in response to receiving digital messages to turn off the lighting load 104 from the remote control 130.

Figure 18:
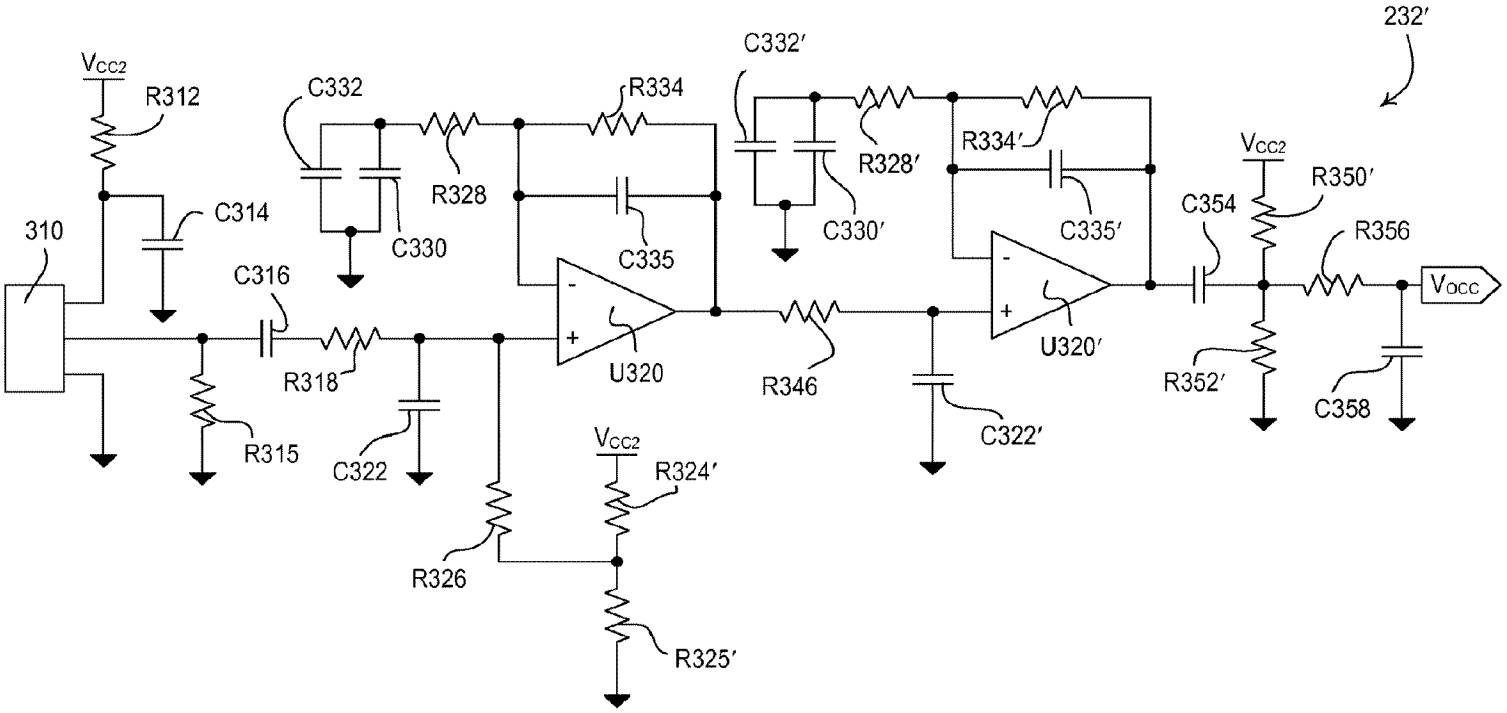
FIG. 18 is a simplified schematic diagram of an occupancy detector circuit 232' according to a fifth embodiment of the present invention.

FIG. 18 is a simplified schematic diagram of an occupancy detector circuit 232' according to a fifth embodiment of the present invention. The occupancy detector circuit 232' comprises a two-stage amplifier circuit having two amplifier stages and no buffer stages. Resistors R324', R325', R350', R352' have, for example, resistances of 1.5 MΩ. The occupancy detector circuit 232' has a gain of approximately 4900 and draws a current having a magnitude of approximately 5 μA or less from the second battery V2.

The present invention has been described with reference to the lighting control system 100 having a plurality of occupancy sensors 120 (i.e., the dimmer switch 100 is operable to both turn on and turn off the lighting load 104 in response to the occupancy sensors). However, the concepts of the present invention can also be applied to a lighting control system having a plurality of vacancy sensors in which the dimmer switch 110 would not turn on, but would only turn off, the lighting load 104 in response to the vacancy sensors. To implement this control with the lighting control system described in the flowcharts of FIGS. 5-12, the dimmer switch 110 could simply not turn on the lighting load 104 and not start the failsafe timer in response to receiving an occupied-take-action command (i.e., skip steps 1118 and 1120 of the received message procedure 1100 of FIG. 11A). Alternatively, the vacancy sensors could simply transmit occupied-no-action commands rather that the occupied-take-action commands (at step 824 of the occupancy detection procedure 800 of FIG. 8). In both cases, the dimmer switch 100 would only turn on the lighting load 100 in response to a manual actuation of the toggle actuator 114 or the intensity adjustment actuator 116, using the dimmer actuator procedure 600 of FIGS. 6A and 6B.

While the present invention has been described with reference to the dimmer switch 110 for controlling the intensity of the lighting load 104, the concepts of the present invention could be applied to load control systems comprising other types of load control devices, such as, for example, fan-speed controls for fan motors, electronic dimming ballasts for fluorescent loads, and drivers for light-emitting diodes (LEDs). In addition, the concepts of the present invention could be used to control other types of electrical loads, such as, for example, fan motors or motorized window treatments.

Further, the occupancy sensors 120 could be a part of a larger centralized or distributed lighting control system including a plurality of load control devices (for example, a plurality of dimmers switches). An example of a lighting control system is described in greater detail in commonly-assigned U.S. Pat. No. 6,803,728, issued Oct. 12, 2004, entitled SYSTEM FOR CONTROL OF DEVICES, the entire disclosure of which is hereby incorporated by reference. Another example of a wireless lighting control system is described in greater detail in U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

~~[1. A load control system for controlling the amount of power delivered from an AC power source to an electrical load in a space in response to detecting the presence or absence of an occupant in the space, the system comprising:~~

~~a load control device adapted to be coupled in series electrical connection between the AC power source and the electrical load for control of the amount of power delivered to the electrical load, the load control device operable to receive wireless control signals and to control the amount of power delivered to the electrical load in response to the wireless control signals;~~

~~an occupancy sensor comprising a controller, an occupancy detector circuit for detecting the presence or absence of the occupant in the space and a wireless transmitter for transmitting a first wireless control signal to the load control device in response to the occupancy detector circuit detecting the presence of the occupant in the space, the load control device operable to enable the delivery of power to the electrical load in response to the first wireless control signal, the occupancy sensor further comprising a battery for powering the controller and the wireless transmitter, the controller operable to monitor the magnitude of a battery voltage of the battery; and~~

~~a visual indicator for providing a visual indication when the magnitude of the battery voltage has dropped below a predetermined low-battery voltage threshold.]~~

~~[2. The system of claim 1, wherein the occupancy sensor comprises the visual indicator, the visual indicator coupled to the controller, such that the controller is operable to controllably illuminate the visual indicator in response to the detector circuit detecting the occupancy condition if the magnitude of the battery voltage is less than the predetermined low-battery voltage threshold.]~~

~~[3. The system of claim 2, wherein the controller blinks the visual indicator in response to the detector circuit detecting the presence of the occupant in the space if the magnitude of the battery voltage is less than the predetermined low-battery voltage threshold.]~~

~~[4. The system of claim 2, wherein the controller only illuminates the visual indicator for a predetermined period of time when the occupancy detector first detects the presence of the occupant in the space.]~~

~~[5. The system of claim 2, wherein the occupancy sensor does not transmit any wireless control signals when the magnitude of the battery voltage is less than the predetermined low-battery voltage threshold.]~~

~~[6. The system of claim 2, wherein the occupancy sensor further comprises an actuator coupled to the controller, such that the controller is responsive to actuations of the actuator when the magnitude of the battery voltage is greater than or equal to the predetermined low-battery voltage threshold, the controller not responsive to actuations of the actuator when the magnitude of the battery voltage is less than the predetermined low-battery voltage threshold.]~~

~~[7. The system of claim 2, wherein the occupancy detector circuit of the occupancy detector comprises an infrared detector responsive to infrared energy representative of the presence or absence of the occupant in the space, the occupancy detector further comprising a lens positioned to direct the infrared energy from the space to the infrared detector, and a light-emitting diode positioned to illuminate the lens, the light-emitting diode coupled to the controller, such that the controller is operable to controllably illuminate the light-emitting diode, the controller operable to illuminate the light-emitting diode to illuminate the lens in response to the detector circuit detecting the presence of the occupant in the space if the magnitude of the battery voltage is less than the predetermined low-battery voltage threshold.]~~

~~[8. The system of claim 1, wherein the load control device comprises the visual indicator, the occupancy sensor operable to transmit a second wireless signal to the load control device in response to determining that the magnitude of the battery voltage has dropped below the predetermined low-battery voltage threshold, the load control device operable to illuminate the visual indicator in response to receiving the second wireless signal from the occupancy sensor.]~~

~~[9. The system of claim 8, wherein the load control device blinks the visual indicator in response to receiving the second wireless signal.]~~

~~[10. A wireless occupancy sensor for detecting the presence or absence of an occupant in a space, the sensor comprising:~~

~~a detector circuit for detecting the presence or absence of the occupant in the space;~~

~~a controller coupled to the detector circuit, such that the controller is responsive to the detector circuit;~~

~~a wireless transmitter coupled to the controller for transmitting wireless signals;~~

~~a visual indicator coupled to the controller, such that the controller is operable to controllably illuminate the visual indicator; and~~

~~a battery for producing a battery voltage for powering the controller, the wireless transmitter, and the visual indicator;~~

~~wherein the controller monitors the magnitude of the battery voltage of the battery, the controller operable to transmit wireless signals in response to the detector circuit detecting the presence of the occupant in the space if the magnitude of the battery voltage is greater than or equal to a predetermined low-battery voltage threshold, the controller operable to illuminate the visual indicator in response to the detector circuit detecting the presence of the occupant in the space if~~

~~the magnitude of the battery voltage is less than the predetermined low-battery voltage threshold.]~~

~~[11. The sensor of claim 10, wherein the controller blinks the visual indicator for a predetermined time period in response to the detector circuit detecting the presence of the occupant in the space if the magnitude of the battery voltage is less than the predetermined low-battery voltage threshold.]~~

~~[12. The sensor of claim 10, wherein the detector circuit comprises an infrared detector responsive to infrared energy representative of the occupancy condition in the space, the sensor further comprising:~~

~~an enclosure housing the detector circuit, the controller, the wireless transmitter, the visual indicator, and the battery;~~

~~a lens positioned to direct the infrared energy from the space to the infrared detector; and~~

~~a light-emitting diode positioned to illuminate the lens, the light-emitting diode coupled to the controller, such that the controller is operable to controllably illuminate the light-emitting diode;~~

~~wherein the lens and the light-emitting diode define the visual indicator, the controller operable to illuminate the light-emitting diode to illuminate the lens in response to the detector circuit detecting the presence of the occupant in the space if the magnitude of the battery voltage is less than the predetermined low-battery voltage threshold.]~~

~~[13. The sensor of claim 10, further comprising~~

~~an actuator coupled to the controller, such that the controller is responsive to actuations of the actuator when the magnitude of the battery voltage is greater than or equal to the predetermined low-battery voltage threshold, the controller not responsive to actuations of the actuator when the magnitude of the battery voltage is less than the predetermined low-battery voltage threshold.]~~

~~[14. A method of controlling the amount of power delivered from an AC power source to an electrical load located in a space, the method comprising the steps of:~~

~~providing an occupancy sensor having a first battery, a controller, an occupancy detector circuit, and a wireless transmitter;~~

~~powering the controller and the wireless transmitter with the first battery;~~

~~detecting the presence of an occupant in the space in the space;~~

~~transmitting a first wireless signal in response to the step of detecting the presence or absence of an occupant in the space;~~

~~monitoring the magnitude of a first battery voltage of the first battery;~~

~~determining that the magnitude of the first battery voltage has dropped below a predetermined low-battery voltage threshold; and~~

~~providing a visual indication in response to determining that the magnitude of the battery voltage has dropped below the predetermined low-battery voltage threshold.]~~

~~[15. The method of claim 14, wherein the occupancy sensor further comprises a visual indicator and the step of providing a visual indication comprises illuminating the visual indicator in response to determining that the magnitude of the first battery voltage has dropped below the predetermined low-battery voltage threshold.]~~

~~[16. The method of claim 15, wherein the step of providing a visual indication comprises blinking the visual indicator for a predetermined time period in response to determining that the magnitude of the first battery voltage has dropped below the predetermined low-battery voltage threshold.]~~

~~[17. The method of claim 15, wherein the occupancy sensor does not transmit any wireless control signals when the magnitude of the battery voltage is less than the predetermined low-battery voltage threshold.]~~

~~[18. The method of claim 15, wherein the step of providing a visual indication comprises only illuminating the visual indicator when the magnitude of the first battery voltage is below the predetermined low-battery voltage threshold and the occupancy detector detects the presence of the occupant in the space.]~~

~~[19. The method of claim 14, further comprising the step of:~~

~~providing a load control device adapted to be coupled in series electrical connection between the AC power source and the electrical load for controlling the amount of power delivered to the electrical load, the load control device comprising a visual indicator;~~

~~transmitting a second wireless signal from the occupancy sensor to the load control device in response to determining that the magnitude of the first battery voltage has dropped below the predetermined low-battery voltage threshold;~~

~~wherein the step of providing a visual indication comprises illuminating the visual indicator of the load control device in response to the load control device receiving the second wireless signal.]~~

~~[20. The method of claim 19, wherein the step of providing a visual indication comprises blinking the visual indicator of the load control device in response to the load control device receiving the second wireless signal.]~~

*21. A load control system for controlling the amount of power delivered from an AC power source to an electrical load in a space in response to detecting the presence or absence of an occupant in the space, the system comprising:*

*a load control device adapted to be coupled in series electrical connection between the AC power source and the electrical load for control of the amount of power delivered to the electrical load, the load control device operable to receive wireless control signals and to control the amount of power delivered to the electrical load in response to the wireless control signals;*

*an occupancy sensor positioned remote from the load control device, and comprising a controller, an occupancy detector circuit for detecting the presence or absence of the occupant in the space and a wireless transmitter for transmitting a first wireless occupied-take-action control signal to the load control device in response to the occupancy detector circuit detecting the presence of the occupant in the space, the load control device operable to enable the delivery of power to the electrical load in response to the first wireless occupied-take-action control signal, the occupancy sensor further comprising a battery for powering the controller and the wireless transmitter, the controller operable to monitor the magnitude of a battery voltage of the battery; and*

*a visual indicator for providing a visual indication when the magnitude of the battery voltage has dropped below a predetermined low-battery voltage threshold,*

*the occupancy sensor further comprising an ambient light detector coupled to the controller, the controller con-*

*figured to compare a level of ambient light in the space detected by the ambient light detector to an ambient light threshold;*

*the occupancy sensor having a low-battery operating mode wherein the controller is configured to halt a normal mode of operation of the occupancy sensor to conserve battery power when the magnitude of the battery voltage has dropped below the predetermined low-battery voltage threshold,*

*the occupancy sensor remaining operable in the low-battery operating mode;*

*further wherein the controller is configured in the normal mode of operation to transmit both the first wireless occupied-take-action control signal and a first wireless occupied-no-action control signal, wherein the first wireless occupied-take-action control signal informs the load control device that the space is occupied and commands the load control device to take action because the ambient light level is below the ambient light threshold, and the first wireless occupied-no-action control signal informs the load control device that the space is occupied and commands the load control device to take no action because the ambient light level is above the ambient light threshold,*

*wherein the load control device comprises an electrical device controller configured:*

*to determine whether the first wireless occupied-take-action control signal has been received, and in response to determining that the first wireless occupied-take-action control signal has been received, to register the occupancy sensor as being in an occupied state and to turn on the electrical load; and*

*to determine whether the first wireless occupied-no-action control signal has been received, and in response to determining that the first wireless occupied-no-action control signal has been received, to register the occupancy sensor as being in an occupied state and to maintain the electrical load in its last condition by leaving the electrical load on when the electrical load is on and leaving the electrical load off when the electrical load is off,*

*wherein the controller is configured to prevent transmission of the first wireless occupied-take-action control signal and the first wireless occupied-no-action control signal in the low-battery operating mode,*

*the occupancy sensor further comprising an occupancy timer that times-out a predetermined time-out period after the occupancy sensor determines the space is unoccupied, the controller being configured upon expiration of the time-out period to change to a vacant state and to determine whether the magnitude of the battery voltage has dropped below the low-battery voltage threshold and if it has not, to transmit a wireless vacant command to the load control device and if it has, not to transmit the wireless vacant command;*

*further wherein the load control device comprises a failsafe timer, the failsafe timer being started when the wireless occupied-take-action control signal or the wireless occupied-no-action control signal is received from the occupancy sensor, the failsafe timer timing-out after a failsafe period when no wireless occupied-take-action and no wireless occupied-no-action control signal is received during the failsafe period from the occupancy sensor, the time-out of the failsafe timer causing the load control device to turn off the electrical load and to identify the occupancy sensor as vacant.*

*22. The system of claim 21, wherein the occupancy sensor comprises the visual indicator, the visual indicator coupled to the controller, the controller being configured to controllably illuminate the visual indicator in response to detection by the detector circuit of the occupancy condition when the magnitude of the battery voltage is less than the predetermined low-battery voltage threshold.*

*23. The system of claim 22, wherein the controller is configured to blink the visual indicator in response to detection by the detector circuit of the presence of the occupant in the space when the magnitude of the battery voltage is less than the predetermined low-battery voltage threshold.*

*24. The system of claim 22, wherein the controller is configured to illuminate the visual indicator for a predetermined period of time only in response to a first detection by the occupancy detector of the presence of the occupant in the space.*

*25. The system of claim 22, wherein the occupancy sensor does not transmit any wireless control signals when the magnitude of the battery voltage is less than the predetermined low-battery voltage threshold.*

*26. The system of claim 22, wherein the occupancy sensor further comprises an actuator coupled to the controller, the controller responsive to actuations of the actuator when the magnitude of the battery voltage is greater than or equal to the predetermined low-battery voltage threshold, the controller not responsive to actuations of the actuator when the magnitude of the battery voltage is less than the predetermined low-battery voltage threshold.*

*27. The system of claim 22, wherein the occupancy detector circuit of the occupancy detector comprises an infrared detector responsive to infrared energy representative of the presence or absence of the occupant in the space, the occupancy detector further comprising a lens positioned to direct the infrared energy from the space to the infrared detector, and a light-emitting diode positioned to illuminate the lens, the light-emitting diode coupled to the controller, the controller configured to controllably illuminate the light-emitting diode, the controller configured to illuminate the light-emitting diode to illuminate the lens in response to detection by the detector circuit of the presence of the occupant in the space when the magnitude of the battery voltage is less than the predetermined low-battery voltage threshold.*

*28. The system of claim 21, wherein the load control device comprises the visual indicator, the occupancy sensor configured to transmit a second wireless signal to the load control device in response to determining that the magnitude of the battery voltage has dropped below the predetermined low-battery voltage threshold, the load control device configured to illuminate the visual indicator in response to receiving the second wireless signal from the occupancy sensor.*

*29. The system of claim 28, wherein the load control device is configured to blink the visual indicator in response to receiving the second wireless signal.*

*30. A wireless occupancy sensor for detecting the presence or absence of an occupant in a space, the sensor comprising:*

*a detector circuit for detecting the presence or absence of the occupant in the space;*

*a controller coupled to the detector circuit, such that the controller is responsive to the detector circuit;*

*an ambient light detector coupled to the controller, the controller configured to compare a level of ambient*

*light in the space detected by the ambient light detector to an ambient light threshold;*

*a wireless transmitter coupled to the controller for transmitting wireless signals;*

*a visual indicator coupled to the controller, such that the controller is operable to controllably illuminate the visual indicator; and*

*a battery for producing a battery voltage for powering the controller, the wireless transmitter, and the visual indicator;*

*wherein the controller is configured to monitor the magnitude of the battery voltage of the battery, the controller operable to transmit wireless signals in response to the detector circuit detecting the presence of the occupant in the space in a normal mode if the magnitude of the battery voltage is greater than or equal to a predetermined low-battery voltage threshold, the controller configured to enter a low-battery operating mode to conserve battery power when the magnitude of the battery voltage is less than the predetermined low-battery voltage threshold wherein the controller remains operable in the low-battery operating mode, the controller operable in the low-battery operating mode to illuminate the visual indicator in response to the detector circuit detecting the presence of the occupant in the space if the magnitude of the battery voltage is less than the predetermined low-battery voltage threshold,*

*further wherein the controller is configured in the normal mode to transmit both a wireless occupied-take-action control signal and a wireless occupied-no-action control signal, wherein the wireless occupied-take-action control signal informs a load control device that the space is occupied and commands the load control device to take action because the ambient light level is below the ambient light threshold, and the wireless occupied-no-action control signal informs the load control device that the space is occupied and commands the load control device to take no action because the ambient light level is above the ambient light threshold;*

*wherein the controller is configured to prevent transmission of the wireless occupied-take-action control signal and the wireless occupied-no-action control signal in the low-battery operating mode,*

*the occupancy sensor further comprising an occupancy timer that times-out a predetermined time-out period after the occupancy sensor determines the space is unoccupied, the controller being configured upon expiration of the time-out period to change to a vacant state and to determine whether the magnitude of the battery voltage has dropped below the low-battery voltage threshold and if it has not, to transmit a wireless vacant command to the load control device and if it has, not to transmit the wireless vacant command,*

*wherein the occupancy sensor is positioned remote from the load control device;*

*further wherein the occupancy sensor is configured to operate with a load control device that comprises a failsafe timer, the failsafe timer being started when the wireless occupied-take-action control signal or the wireless occupied-no-action control signal is received from the occupancy sensor, the failsafe timer timing-out after a failsafe period when no wireless occupied-take-action and no wireless occupied-no-action control signal is received during the failsafe period from the occupancy sensor, the time-out of the failsafe timer causing the load control device to turn off the electrical load and to identify the occupancy sensor as vacant;*

*further wherein the occupancy sensor is configured to transmit, when in the low-battery operating mode, a failsafe disable message to the load control device instructing the load control device to disable the failsafe timer, such that the load control device does not turn off the electrical load at the end of the failsafe period when the occupancy sensor is in the low-battery operating mode.*

*31. The sensor of claim 30, wherein the controller is configured to blink the visual indicator for a predetermined time period in response to detection by the detector circuit of the presence of the occupant in the space when the magnitude of the battery voltage is less than the predetermined low-battery voltage threshold.*

*32. The sensor of claim 30, wherein the detector circuit comprises an infrared detector responsive to infrared energy representative of the occupancy condition in the space, the sensor further comprising:*

*an enclosure housing the detector circuit, the controller, the ambient light detector, the wireless transmitter, the visual indicator, and the battery;*

*a lens positioned to direct the infrared energy from the space to the infrared detector; and*

*a light-emitting diode positioned to illuminate the lens, the light-emitting diode coupled to the controller, the controller being configured to controllably illuminate the light-emitting diode;*

*wherein the lens and the light-emitting diode define the visual indicator, the controller configured to illuminate the light-emitting diode to illuminate the lens in response to detection by the detector circuit of the presence of the occupant in the space when the magnitude of the battery voltage is less than the predetermined low-battery voltage threshold.*

*33. The sensor of claim 30, further comprising:*

*an actuator coupled to the controller, the controller responsive to actuations of the actuator when the magnitude of the battery voltage is greater than or equal to the predetermined low-battery voltage threshold, the controller not responsive to actuations of the actuator when the magnitude of the battery voltage is less than the predetermined low-battery voltage threshold to conserve battery power.*

*34. A method of controlling by a load control device the amount of power delivered from an AC power source to an electrical load located in a space, the method comprising the steps of:*

*providing an occupancy sensor wherein the occupancy sensor is positioned remote from the load control device, and having a first battery, a controller, an occupancy detector circuit, an ambient light detector and a wireless transmitter;*

*powering the controller and the wireless transmitter with the first battery;*

*detecting the presence of an occupant in the space;*

*detecting with the ambient light detector the level of ambient light in the space and comparing the ambient light in the space to an ambient light threshold;*

*transmitting a first wireless signal in response to the step of detecting the presence or absence of an occupant in the space;*

*the step of transmitting including operating the controller in a normal mode of operation to transmit both a wireless occupied-take-action control signal and a wireless occupied-no-action control signal, wherein the*

*wireless occupied-take-action control signal informs the load control device that the space is occupied and commands the load control device to take action because the ambient light level is below the ambient light threshold, and the wireless occupied-no-action control signal informs the load control device that the space is occupied and commands the load control device to take no action because the ambient light level is above the ambient light threshold,*

*maintaining by the load control device, in response to receiving the wireless occupied-no-action control signal, the electrical load in its last condition;*

*monitoring the magnitude of a first battery voltage of the first battery;*

*determining that the magnitude of the first battery voltage has dropped below a predetermined low-battery voltage threshold and entering a low-battery operating mode, and, in the low-battery operating mode, halting a normal mode of operation to conserve battery power with the controller remaining operable; and*

*providing, in the low-battery operating mode, a visual indication in response to determining that the magnitude of the battery voltage has dropped below the predetermined low-battery voltage threshold; and*

*preventing transmission of the wireless occupied-take-action control signal and the wireless occupied-no-action control signal in the low-battery operating mode;*

*further comprising providing an occupancy time-out period that expires a predetermined time after the occupancy sensor determines the space is unoccupied, and upon expiration of the time-out period:*

*changing to a vacant state; and*

*checking to determine if the magnitude of the battery voltage has dropped below the low-battery voltage threshold and if it has not, transmitting a wireless vacant command to the load control device, and if it has, not transmitting the wireless vacant command;*

*further comprising providing in the load control device a failsafe timer, starting the failsafe timer when the wireless occupied-take-action control signal or the wireless occupied-no-action control signal is received from the occupancy sensor, the failsafe timer timing-out after a failsafe period when no wireless occupied-take-action control signal and no wireless occupied-no-action control signal is received during the failsafe period from the occupancy sensor, the time-out of the failsafe timer causing the load control device to turn off the electrical load and to identify the occupancy sensor as vacant;*

*further comprising the occupancy sensor transmitting, when in the low-battery operating mode, a failsafe disable message to the load control device instructing the load control device to disable the failsafe timer, such that in response to receiving the failsafe disable message the load control device does not turn off the electrical load at the end of the failsafe period when the occupancy sensor is in the low-battery operating mode.*

*35. The method of claim 34, wherein the occupancy sensor further comprises a visual indicator and the step of providing a visual indication comprises illuminating the visual indicator in response to determining that the magnitude of the first battery voltage has dropped below the predetermined low-battery voltage threshold.*

*36. The method of claim 35, wherein the step of providing a visual indication comprises blinking the visual indicator for a predetermined time period in response to determining that the magnitude of the first battery voltage has dropped below the predetermined low-battery voltage threshold.*

*37. The method of claim 35, wherein the occupancy sensor does not transmit any wireless control signals when the magnitude of the battery voltage is less than the predetermined low-battery voltage threshold.*

*38. The method of claim 35, wherein the step of providing a visual indication comprises only illuminating the visual indicator when the magnitude of the first battery voltage is below the predetermined low-battery voltage threshold and the occupancy detector detects the presence of the occupant in the space.*

*39. The method of claim 34, further comprising the step of:*

*providing a load control device adapted to be coupled in series electrical connection between the AC power source and the electrical load for controlling the amount of power delivered to the electrical load, the load control device comprising a visual indicator;*

*transmitting a second wireless signal from the occupancy sensor to the load control device in response to determining that the magnitude of the first battery voltage has dropped below the predetermined low-battery voltage threshold;*

*wherein the step of providing a visual indication comprises illuminating the visual indicator of the load control device in response to the load control device receiving the second wireless signal.*

*40. The method of claim 39, wherein the step of providing a visual indication comprises blinking the visual indicator of the load control device in response to the load control device receiving the second wireless signal.*

* * * * *